US012101606B2

(12) United States Patent
Griffin et al.

(10) Patent No.: US 12,101,606 B2
(45) Date of Patent: Sep. 24, 2024

(54) METHODS AND SYSTEMS FOR ASSESSING INSERTION POSITION OF HEARING INSTRUMENT

(71) Applicant: Starkey Laboratories, Inc., Eden Prairie, MN (US)

(72) Inventors: Kendra Griffin, Bloomington, MN (US); Paul Reinhart, Minneapolis, MN (US); Tracie Tuss, Minneapolis, MN (US); Kent Collins, St. Paul, MN (US); Michael Karl Sacha, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 17/804,255

(22) Filed: May 26, 2022

(65) Prior Publication Data

US 2022/0386048 A1 Dec. 1, 2022

Related U.S. Application Data

(60) Provisional application No. 63/194,658, filed on May 28, 2021.

(51) Int. Cl.
*H04R 25/00* (2006.01)

(52) U.S. Cl.
CPC .......... *H04R 25/70* (2013.01); *H04R 25/507* (2013.01)

(58) Field of Classification Search
CPC ................ H04R 1/1016; H04R 25/652; H04R 2225/0216; H04R 2225/023;
(Continued)

(56) References Cited

U.S. PATENT DOCUMENTS 5,469,855 A 11/1995 Pompei et al.
5,825,894 A 10/1998 Shennib
(Continued)

FOREIGN PATENT DOCUMENTS

CH 717566 A2 * 12/2021
CN 110999315 A * 4/2020 .......... H04R 1/1016
(Continued)

OTHER PUBLICATIONS

International Search Report and Written Opinion of International Application No. PCT/US2021/045485 dated Mar. 31, 2022, 18 pp.
(Continued)

*Primary Examiner* — Ryan Robinson
(74) *Attorney, Agent, or Firm* — Shumaker & Sieffert, P.A.

(57) ABSTRACT

A method for fitting a hearing instrument comprises obtaining sensor data from a plurality of sensors belonging to a plurality of sensor types; applying a machine learned (ML) model to determine, based on the sensor data, an applicable fitting category of the hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generating an indication based on the applicable fitting category of the hearing instrument.

25 Claims, 16 Drawing Sheets

(58) Field of Classification Search
CPC .......... H04R 2225/025; H04R 2225/39; H04R 2225/83; H04R 2460/15; H04R 2460/17
See application file for complete search history.

(56) References Cited

U.S. PATENT DOCUMENTS

| | | | | |
|---|---|---|---|---|
| 5,923,764 | A | 7/1999 | Shennib | |
| 6,556,852 | B1 | 4/2003 | Schulze et al. | |
| 7,660,426 | B2 * | 2/2010 | Hannibal | H04R 25/70 381/60 |
| 8,165,329 | B2 | 4/2012 | Bisgaard | |
| 8,306,774 | B2 | 11/2012 | Quinn et al. | |
| 9,107,586 | B2 | 8/2015 | Tran | |
| 9,288,584 | B2 | 3/2016 | Hansen et al. | |
| 9,439,009 | B2 | 9/2016 | Kim et al. | |
| 9,445,768 | B2 | 9/2016 | Alexander et al. | |
| 9,516,438 | B2 | 12/2016 | Andersen et al. | |
| 9,596,551 | B2 | 3/2017 | Pedersen et al. | |
| 9,635,469 | B2 | 4/2017 | Lunner et al. | |
| 9,723,415 | B2 | 8/2017 | Gran et al. | |
| 9,838,771 | B1 | 12/2017 | Masaki et al. | |
| 9,838,775 | B2 | 12/2017 | Qian et al. | |
| 9,860,650 | B2 | 1/2018 | Bürger et al. | |
| 9,860,653 | B2 | 1/2018 | Olsen et al. | |
| 9,900,712 | B2 | 2/2018 | Galster et al. | |
| 10,219,069 | B2 * | 2/2019 | Urup | H04R 1/10 |
| 10,341,784 | B2 | 7/2019 | Recker et al. | |
| 10,455,337 | B2 | 10/2019 | Yoo | |
| 11,470,413 | B2 * | 10/2022 | Andersen | H04R 1/1041 |
| 11,638,085 | B2 * | 4/2023 | Monsarrat-Chanon | H04R 25/30 381/328 |
| 11,722,809 | B2 * | 8/2023 | Andersen | H04R 3/04 381/374 |
| 2003/0016728 | A1 | 1/2003 | Gerlitz | |
| 2005/0123146 | A1 | 6/2005 | Voix et al. | |
| 2010/0067722 | A1 | 3/2010 | Bisgaard | |
| 2010/0142739 | A1 | 6/2010 | Schindler | |
| 2010/0239112 | A1 | 9/2010 | Howard et al. | |
| 2010/0253505 | A1 | 10/2010 | Chou | |
| 2011/0044483 | A1 | 2/2011 | Edgar | |
| 2011/0058681 | A1 | 3/2011 | Naylor | |
| 2011/0091058 | A1 | 4/2011 | Sacha et al. | |
| 2011/0238419 | A1 | 9/2011 | Barthel | |
| 2011/0261983 | A1 | 10/2011 | Claussen et al. | |
| 2012/0101514 | A1 | 4/2012 | Keady et al. | |
| 2013/0216434 | A1 | 8/2013 | Ow-wing | |
| 2015/0110323 | A1 | 4/2015 | Sacha | |
| 2015/0222821 | A1 | 8/2015 | Shaburova et al. | |
| 2016/0166203 | A1 | 6/2016 | Goldstein | |
| 2016/0309266 | A1 * | 10/2016 | Olsen | H04R 25/305 |
| 2016/0373869 | A1 | 12/2016 | Gran et al. | |
| 2017/0258329 | A1 | 9/2017 | Marsh | |
| 2018/0014784 | A1 | 1/2018 | Heeger et al. | |
| 2019/0076058 | A1 * | 3/2019 | Piechowiak | A61B 5/6803 |
| 2019/0110692 | A1 | 4/2019 | Pardey et al. | |
| 2021/0014619 | A1 * | 1/2021 | Sacha | H04R 25/556 |
| 2021/0204074 | A1 * | 7/2021 | Recker | H04R 25/50 |
| 2022/0109925 | A1 | 4/2022 | Xue et al. | |
| 2022/0264232 | A1 * | 8/2022 | Guo | H04R 25/453 |

FOREIGN PATENT DOCUMENTS

| | | | | |
|---|---|---|---|---|
| DK | 1703770 | T3 | 6/2017 | |
| EP | 2813175 | A2 | 6/2014 | |
| EP | 2908550 | B1 | 8/2015 | |
| EP | 3086574 | A2 | 4/2016 | |
| EP | 3113519 | A1 | 6/2016 | |
| EP | 3448064 | A1 | 8/2018 | |
| JP | 2009232298 | A | 10/2009 | |
| KR | 20000029582 | A | 5/2000 | |
| WO | 198901315 | A1 | 2/1989 | |
| WO | 2006091106 | A1 | 8/2006 | |
| WO | WO-2010049543 | A2 * | 5/2010 | H04R 25/305 |
| WO | 2012149955 | A1 | 8/2012 | |
| WO | 2012044278 | A1 | 4/2021 | |
| WO | 2022066307 | A2 | 3/2022 | |
| WO | WO-2022042862 | A1 * | 3/2022 | |

OTHER PUBLICATIONS

"How to Put on a Hearing Aid", Widex, Oct. 26, 2016, 7 pages.
"Mobile Fact Sheet," Pew Research Center: Internet and Technology, accessed from: http://www.pewinternet.org/fact-sheet/mobile/, retrieved from https://web.archive.org/web/20191030053637/https://www.pewresearch.org/internet/fact-sheet/mobile/, Jun. 2019, 4 pp.
Anderson et al., "Tech Adoption Climbs Among Older Adults", Pew Research Center: Internet and Technology, accessed from: http://www.pewinternet.org/2017/05/17/technology-use-among-seniors/, May 2017, 23 pp.
Boothroyd, "Adult Aural Rehabilitation: What Is It and Does It Work?", vol. 11 No. 2, Jun. 2007, pp. 63-71.
Chan et al., "Estimation of eardrum acoustic pressure and of ear canal length from remote points in the canal", Journal of the Acoustical Society of America, vol. 87, No. 3, Mar. 1990, pp. 1237-1247.
Convery et al., "A Self-Fitting Hearing Aid: Need and Concept", Trends in Amplification, Dec. 4, 2011, pp. 157-166.
Convery et al., "Management of Hearing Aid Assembly by Urban-Dwelling Hearing-Impaired Adults in a Developed Country: Implications for a Self-Fitting Hearing Aid", Trends in Amplification, vol. 15, No. 4, Dec. 26, 2011, pp. 196-208.
Convery, "Factors Affecting Reliability and Validity of Self-Directed Automatic In Situ Audiometry: Implications for Self-Fitting Hearing Aids", Journal of the American Academy of Audiology, vol. 26, No. 1, Jan. 2015, 15 pp.
EBPMAN Tech Reviews, "NEW! Nuheara IQbuds Boost Now with Ear ID—NAL/NL2 Detailed Review", YouTube video retrieved Aug. 7, 2019, from https://www.youtube.com/watch?v=AizU7PGVX0A, 1 pp.
Gregory et al.' "Experiences of hearing aid use among patients with mild cognitive impairment and Alzheimer's disease dementia: A qualitative study", SAGE Open Medicine, vol. 8, Mar. 3, 2020, pp. 1-9.
Jerger, "Studies in Impedance Audiometry, 3. Middle Ear Disorders," Archives Otolaryngology, vol. 99, Mar. 1974, pp. 164-171.
Keidser et al., "Self-Fitting Hearing Aids: Status Quo and Future Predictions", Trends in Hearing, vol. 20, Apr. 12, 2016, pp. 1-15.
Kruger et al., "The Acoustic Properties of the Infant Ear, a preliminary report," Acta Otolaryngology, vol. 103, No. 5-6, May-Jun. 1987, pp. 578-585.
Kruger, "An Update on the External Ear Resonance in Infants and Young Children," Ear & Hearing, vol. 8. No. 6, Applicant points out, in accordance with MPEP 609.04(a), that the year of publication, 1987, is sufficiently earlier than the effective U.S. filing date, so that the particular month of publication is not in issue.), 1987, pp. 333-336.
McCormack et al., "Why do people fitted with hearing aids not wear them?", International Journal of Audiology, vol. 52, May 2013, pp. 360-368.
Powers et al., "MarkeTrak 10: Hearing Aids in an Era of Disruption and DTC/OTC Devices", Hearing Review, Aug. 2019, pp. 12-20.
Recker, "Using Average Correction Factors to Improve the Estimated Sound Pressure Level Near the Tympanic Membrane", Journal of the American Academy of Audiology, vol. 23, (Applicant points out, in accordance with MPEP 609.04(a), that the year of publication, 2012, is sufficiently earlier than the effective U.S. filing date, so that the particular month of publication is not in issue.), 2012, pp. 733-750.
Salvinelli, "The external ear and the tympanic membrane, a Three-dimensional Study," Scandinavian Audiology, vol. 20, No. 4, (Applicant points out, in accordance with MPEP 609.04(a), that the year of publication, 1991, is sufficiently earlier than the effective U.S. filing date, so that the particular month of publication is not in issue.), 1991, pp. 253-256.
Strom, "Hearing Review' Survey of RIC Pricing in 2017", Hearing Review, vol. 25, No. 3, Mar. 21, 2018, 8 pp.

(56) References Cited

OTHER PUBLICATIONS

Sullivan, "A Simple and Expedient Method to Facilitate Receiver-in-Canal (RIC) Non-custom Tip Insertion", Hearing Review, vol. 25, No. 3, Mar. 5, 2018, 5 pp.
U.S. Appl. No. 62/939,031, filed Nov. 22, 2019, naming inventors Xue et al.
U.S. Appl. No. 63/194,658, filed May 28, 2021, naming inventors Griffin et al.
Wong et al., "Hearing Aid Satisfaction: What Does Research from the Past 20 Years Say?", Trends in Amplification, vol. 7, Issue 4, Jan. 1, 2003, pp. 117-161.

* cited by examiner

METHODS AND SYSTEMS FOR ASSESSING INSERTION POSITION OF HEARING INSTRUMENT

This application claims the benefit of U.S. Provisional Patent Application 63/194,658, filed May 28, 2021, the entire content of which is incorporated by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earphones, headphones, hearables, and so on. Some hearing instruments include features in addition to or in the alternative to environmental sound amplification. For example, some modern hearing instruments include advanced audio processing for improved device functionality, controlling and programming the devices, and beamforming, and some can communicate wirelessly with external devices including other hearing instruments (e.g., for streaming media).

SUMMARY

This disclosure describes techniques that may help users wear hearing instruments correctly. If a user wears a hearing instrument in an improper way, the user may experience discomfort, may not be able to hear sound generated by the hearing instrument properly, sensors of the hearing instrument may not be positioned to obtain accurate data, the hearing instrument may fall out of the user's ear, or other negative outcomes may occur. This disclosure describes techniques that may address technical problems associated with improper wear of the hearing instruments. For instance, the techniques of this disclosure may involve application of a machine learned (ML) model to determine, based on sensor data from a plurality of sensors, an applicable fitting category of a hearing instrument. The processing system may generate an indication of the applicable fitting category of the hearing instrument. Use of sensor data from a plurality of sensors and use of an ML model may improve accuracy of the determination of the applicable fitting category. Thus, the techniques of this disclosure may provide technical improvements over other hearing instrument fitting systems.

In one example, this disclosure describes a method for fitting a hearing instrument, the method comprising: obtaining, by a processing system, sensor data from a plurality of sensors belonging to a plurality of sensor types; applying, by the processing system, a machine learned (ML) model to determine, based on the sensor data, an applicable fitting category of the hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generating, by the processing system, an indication based on the applicable fitting category of the hearing instrument.

In another example, this disclosure describes a system comprising: a plurality of sensors belonging to a plurality of sensor types; and a processing system comprising one or more processors implemented in circuitry, the processing system configured to: obtain sensor data from the plurality of sensors; apply a machine learned (ML) model to determine, based on the sensor data, an applicable fitting category of a hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generate an indication based on the applicable fitting category of the hearing instrument.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
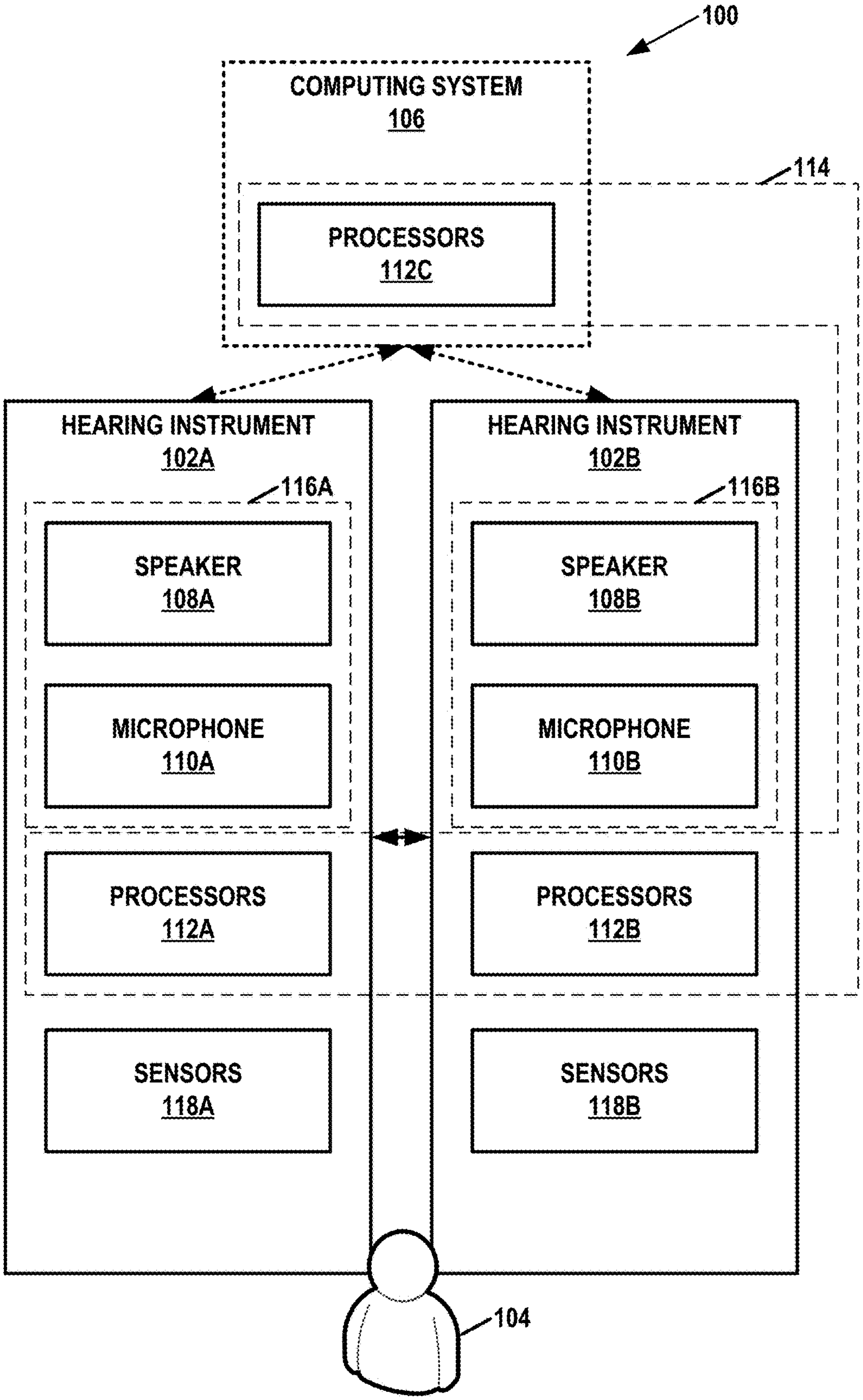
FIG. 1 is a conceptual diagram illustrating an example system that includes one or more hearing instruments, in accordance with one or more aspects of this disclosure.

Sales of over-the-counter (OTC) and direct-to-consumer (DTC) hearing instruments, such as hearing aids, to adults with mild-to-moderate hearing loss have become an established channel for distributing hearing instruments. Thus, users of such hearing instruments may need to correctly place in-ear assemblies of hearing instruments in their own ear canals without help from hearing professionals. However, correct placement of an in-ear assembly of a hearing instrument in a user's own ear canal may be difficult. It may be especially difficult to correctly place in-ear assemblies of receiver-in-the-canal (RIC) hearing instruments, which make up approximately 69% of hearing aids sold in the United States.

The most common problem with placing in-ear assemblies of hearing instruments in users' ear canals is that the users do not insert the in-ear assemblies of the hearing instruments far enough into their ear canals. Other problems with placing hearing instruments may include inserting in-ear assemblies of hearing instruments with wrong orientation, wear of hearing instruments in the wrong ears, and incorrect placement of a behind-the-ear assembly of the hearing instrument. A user's experience can be negatively impacted by not wearing a hearing instrument properly. For example, when a user does not wear their hearing instrument correctly, the hearing instrument may look bad cosmetically, may cause the hearing instrument to be less comfortable physically, may be perceived to have poor sound quality or sensor accuracy, and may cause retention issues (e.g., the in-ear assembly of the hearing instrument may fall out and be lost).

In another example of a negative impact caused by a user not wearing a hearing instrument correctly, under-insertion of the in-ear assembly of the hearing instrument into the user's ear canal may cause hearing thresholds to be overestimated if the hearing thresholds are measured when the in-ear assembly of the hearing instrument is not inserted far enough into the user's ear canal. Overestimation of the user's hearing thresholds may cause the hearing instrument to provide more gain than the hearing instrument otherwise would if the in-ear assembly of the hearing instrument were properly inserted into the user's ear canal. In other words, the hearing instrument may amplify sounds from the user's environment more if the in-ear assembly of the hearing instrument was under-inserted during estimation of the user's hearing thresholds. Providing higher gain may increase the likelihood of the user perceiving audible feedback. Additionally, providing higher gain may increase power consumption and reduce battery life of the hearing instrument.

In another example of a negative impact caused by a user not wearing a hearing instrument correctly, if the user's hearing thresholds were estimated using a transducer other than a transducer of the hearing instrument (e.g., using headphones) and the hearing instrument is programmed to use these hearing thresholds, the hearing instrument may not provide enough gain. In other words, the user's hearing threshold may be properly estimated, and the hearing instrument may be programmed with the proper hearing thresholds, but the resulting gain provided by the hearing instrument may not be enough for the user if the in-ear assembly of the hearing instrument is not placed far enough into the user's ear canal. As a result, the user may not be satisfied with the level of gain provided by the hearing instrument.

This disclosure describes techniques that may overcome one or more of the issues mentioned above. As described herein, a processing system may obtain sensor data from a plurality of sensors belonging to a plurality of sensor types. One or more of the sensors may be included in the hearing instrument itself. The processing system may apply a machine learned (ML) model to determine, based on sensor data, an applicable fitting category of the hearing instrument from among a plurality of predefined fitting categories. The plurality of predefined fitting categories may include a fitting category corresponding to a correct way of wearing the hearing instrument and one or more fitting categories corresponding to incorrect ways of wearing the hearing instrument. The processing system may generate an indication based on the applicable fitting category of the hearing instrument.

FIG. 1 is a conceptual diagram illustrating an example system 100 that includes hearing instruments 102A, 102B, in accordance with one or more aspects of this disclosure. This disclosure may refer to hearing instruments 102A and 102B collectively, as "hearing instruments 102." A user 104 may wear hearing instruments 102. In some instances, such as when user 104 has unilateral hearing loss, user 104 may wear a single hearing instrument. In other instances, such as when user 104 has bilateral hearing loss, the user may wear two hearing instruments, with one hearing instrument for each ear of user 104.

Hearing instruments 102 may comprise one or more of various types of devices that are configured to provide auditory stimuli to user 104 and that are designed for wear and/or implantation at, on, or near an ear of user 104. Hearing instruments 102 may be worn, at least partially, in the ear canal or concha. In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the user's environment, such as recorded music, computer-generated sounds, sounds from a microphone remote from the user, or other types of sounds. For instance, hearing instruments 102 may include so-called "hearables," earbuds, earphones, or other types of devices. Some types of hearing instruments provide auditory stimuli to user 104 corresponding to sounds from the user's environment and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains electronic components of the hearing instrument, including the receiver (e.g., a speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of incoming sound at certain frequencies, translate or compress frequencies of the incoming sound, and/or perform other functions to improve the hearing of user 104. In some examples, hearing instruments 102 may implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, 900 MHz technology, a BLUETOOTH™ technology, WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 comprises one or more computing devices, each of which may include one or more processors. For instance, computing system 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices.

Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

Furthermore, in the example of FIG. 1, hearing instrument 102A includes a speaker 108A, a microphone 110A, a set of one or more processors 112A, and sensors 118A. Hearing instrument 102B includes a speaker 108B, a microphone 110B, a set of one or more processors 112B, and sensors 118A. This disclosure may refer to speaker 108A and speaker 108B collectively as "speakers 108." This disclosure may refer to microphone 110A and microphone 110B collectively as "microphones 110." Computing system 106 includes a set of one or more processors 112C. Processors 112C may be distributed among one or more devices of computing system 106. This disclosure may refer to processors 112A, 112B, and 112C collectively as "processors 112." Processors 112 may be implemented in circuitry and may comprise microprocessors, application-specific integrated circuits, digital signal processors, or other types of circuits.

As noted above, hearing instruments 102A, 102B, and computing system 106 may be configured to communicate with one another. Accordingly, processors 112 may be configured to operate together as a processing system 114. Thus, discussion in this disclosure of actions performed by processing system 114 may be performed by one or more processors in one or more of hearing instrument 102A, hearing instrument 102B, or computing system 106, either separately or in coordination.

Figure 2:
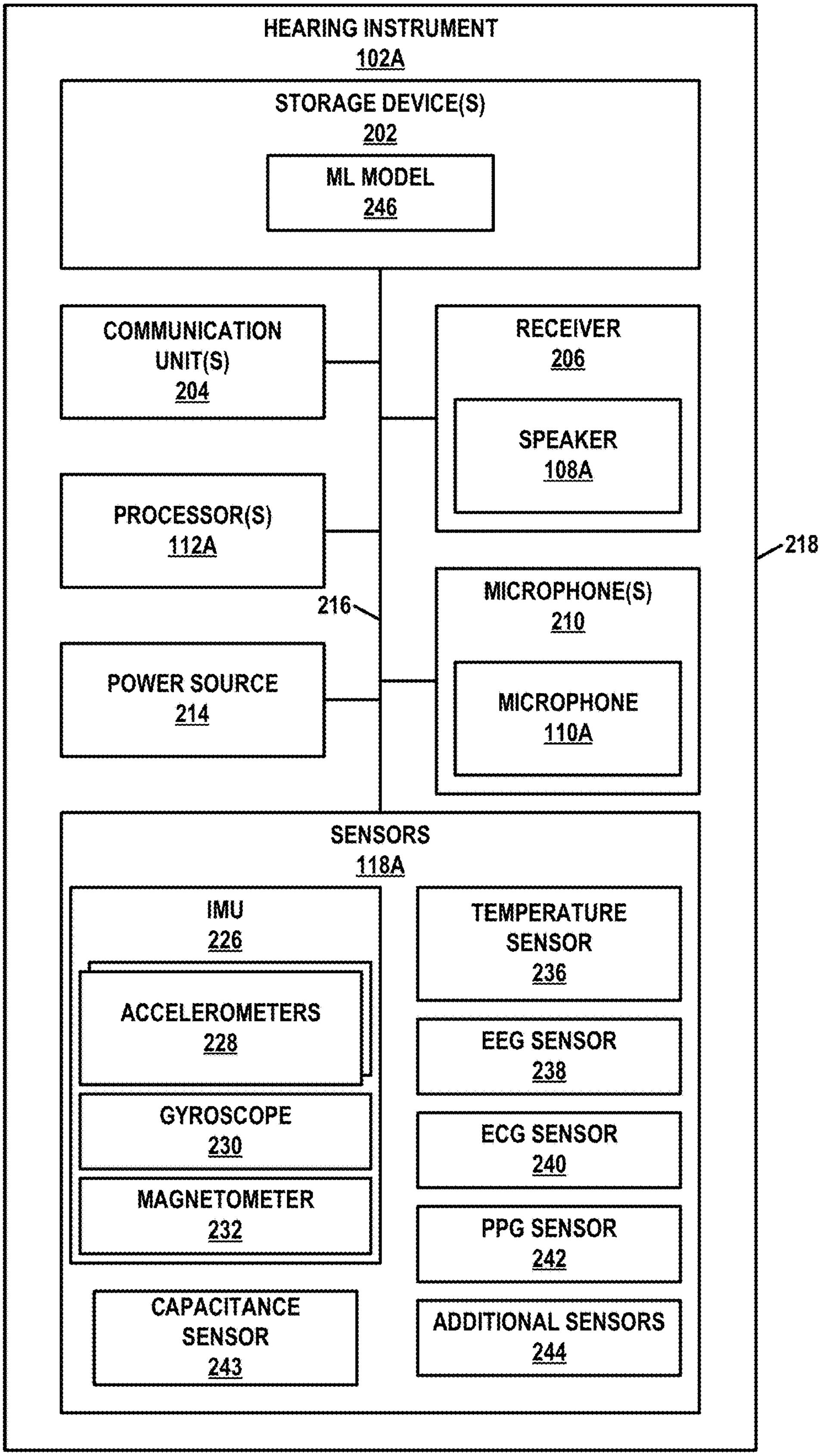
FIG. 2 is a block diagram illustrating example components of a hearing instrument, in accordance with one or more aspects of this disclosure.
Figure 3:
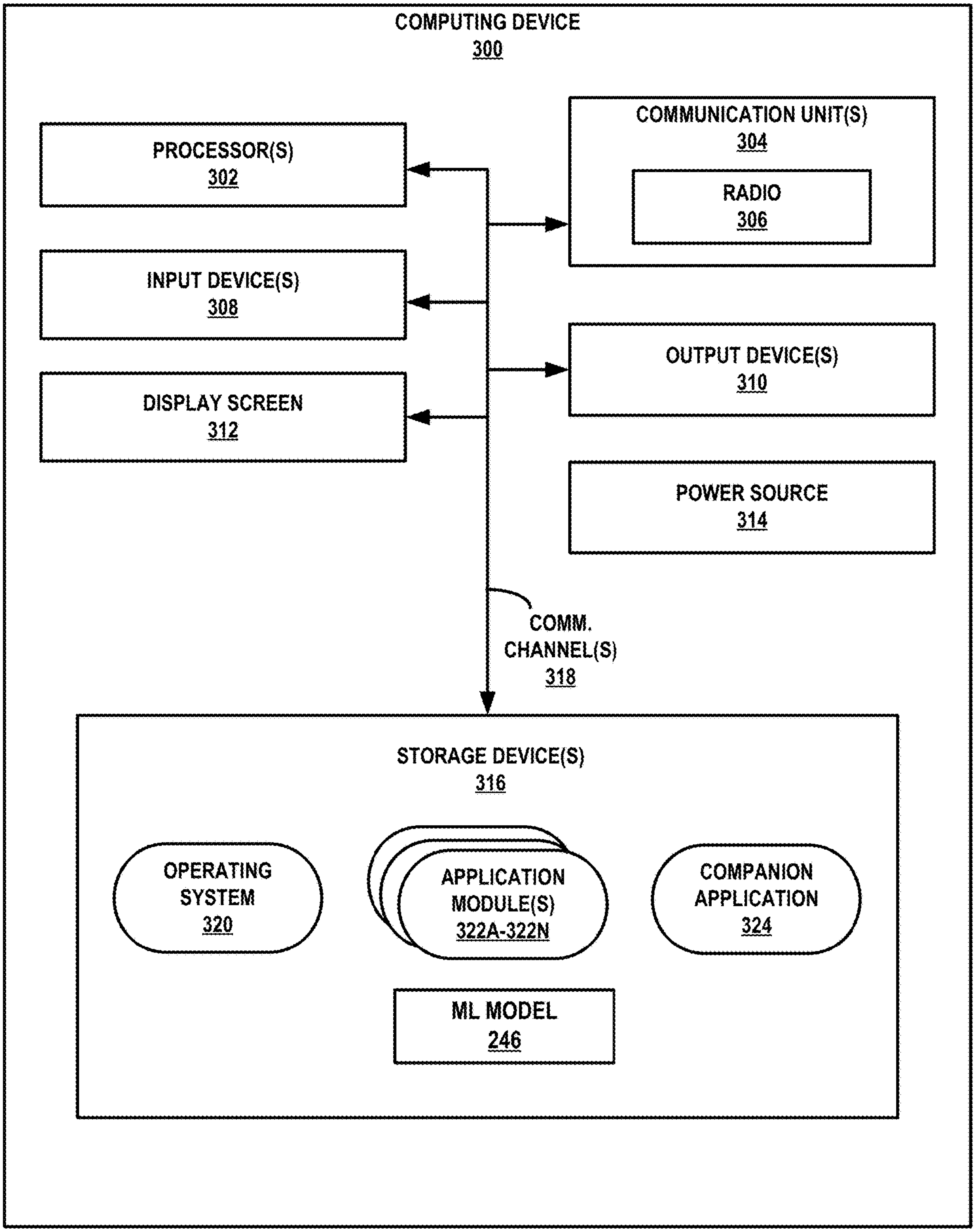
FIG. 3 is a block diagram illustrating example components of a computing device, in accordance with one or more aspects of this disclosure.

It will be appreciated that hearing instruments 102 and computing system 106 may include components in addition to those shown in the example of FIG. 1, e.g., as shown in the examples of FIG. 2 and FIG. 3. For instance, each of hearing instruments 102 may include one or more additional microphones configured to detect sound in an environment of user 104. The additional microphones may include omnidirectional microphones, directional microphones, or other types of microphones.

Speakers 108 may be located on hearing instruments 102 so that sound generated by speakers 108 is directed medially through respective ear canals of user 104. For instance, speakers 108 may be located at medial tips of hearing instruments 102. The medial tips of hearing instruments 102 are designed to be the most medial parts of hearing instruments 102. Microphones 110 may be located on hearing instruments 102 so that microphones 110 may detect sound within the ear canals of user 104.

In the example of FIG. 1, an in-ear assembly 116A of hearing instrument 102A contains speaker 108A and microphone 110A. Similarly, an in-ear assembly 116B of hearing instrument 102B contains speaker 108B and microphone 110B. This disclosure may refer to in-ear assembly 116A and in-ear assembly 116B collectively as "in-ear assemblies 116." The following discussion focuses on in-ear assembly 116A but may be equally applicable to in-ear assembly 116B.

Furthermore, hearing instrument 102A may include sensors 118A. Similarly, hearing instrument 102B may include sensors 118B. This disclosure may refer to sensors 118A and sensors 118B collectively as sensors 118. For each of hearing instruments 102, one or more of sensors 118 may be included in in-ear assemblies 116 of hearing instruments 102. In some examples, one or more of sensors 118 are included in behind-the-ear assemblies of hearing instruments 102 or in cables connecting in-ear assemblies 116 and behind-the-ear assemblies of hearing instruments 102. Although not illustrated in the example of FIG. 1, in some examples, one or more devices other than hearing instruments 102 may include one or more of sensors 118.

Sensors 118 may include various types of sensors. Example types of sensors may include electrocardiogram (ECG) sensors, inertial measurement units (IMUs), electroencephalogram (EEG) sensors, temperature sensors, photoplethysmography (PPG) sensors, capacitance sensors, microphones, cameras, and so on.

In some examples, in-ear assembly 116A also includes one or more, or all of, processors 112A of hearing instrument 102A. Similarly, in-ear assembly 116B of hearing instrument 102B may include one or more, or all of, processors 112B of hearing instrument 102B. In some examples, in-ear assembly 116A includes all components of hearing instrument 102A. Similarly, in some examples, in-ear assembly 116B includes all components of hearing instrument 102B. In other examples, components of hearing instrument 102A may be distributed between in-ear assembly 116A and another assembly of hearing instrument 102A. For instance, in examples where hearing instrument 102A is a RIC device, in-ear assembly 116A may include speaker 108A and microphone 110A and in-ear assembly 116A may be connected to a behind-the-ear assemble of hearing instrument 102A via a cable. Similarly, in some examples, components of hearing instrument 102B may be distributed between in-ear assembly 116B and another assembly of hearing instrument 102B. In examples where hearing instrument 102A is an ITE, ITC, CIC, or IIC device, in-ear assembly 116A may include all primary components of hearing instrument 102A. In examples where hearing instrument 102B is an ITE, ITC, CIC, or IIC device, in-ear assembly 116B may include all primary components of hearing instrument 102B.

In some examples where hearing instrument 102A is a BTE device, in-ear assembly 116A may be a temporary-use structure designed to familiarize user 104 with how to insert a sound tube into an ear canal of user 104. In other words, in-ear assembly 116A may help user 104 get a feel for how far to insert a tip of the sound tube of the BTE device into the ear canal of user 104. Similarly, in some examples where hearing instrument 102B is a BTE device, in-ear assembly 116B may be a temporary-use structure designed to familiarize user 104 with how to insert a sound tube into an ear canal of user 104. In some such examples, speaker 108A (or speaker 108B) is not located in in-ear assembly 116A (or in-ear assembly 116B). Rather, microphone 110A (or microphone 110B) may be in a removable structure that has a shape, size, and feel similar to the tip of a sound tube of a BTE device.

Separate fitting processes may be performed to determine whether user 104 has correctly inserted in-ear assemblies 116 of hearing instruments 102 into the user's ear canals. The fitting process may be the same for each of hearing instruments 102. Accordingly, the following discussion regarding the fitting process for hearing instrument 102A and components of hearing instruments 102A may apply equally with respect to hearing instrument 102B.

During the fitting process for hearing instrument 102A, user 104 attempts to insert in-ear assembly 116A of hearing instrument 102A into an ear canal of user 104. Sensors 118 may generate sensor data during and/or after user 104 attempts to insert in-ear assembly 116A into the ear canal of user 104. For example, a temperature sensor may generate temperature readings during and after user 104 attempts to insert in-ear assembly 116A into the ear canal of user 104. In another example, an IMU of hearing instrument 102A may generate motion signals during and after user 104 attempts to insert in-ear assembly 116A into the ear canal of user 104. In some examples, speaker 108A generates a sound that includes a range of frequencies. The sound is reflected off surfaces within the ear canal, including the user's tympanic membrane (i.e., ear drum). In different examples, speaker 108A may generate sound that includes different ranges of frequencies. For instance, in some examples, the range of frequencies is 2,000 to 20,000 Hz. In some examples, the range of frequencies is 2,000 to 16,000 Hz. In other examples, the range of frequencies has different low and high boundaries. Microphone 110A measures an acoustic response to the sound generated by speaker 108A. The acoustic response to the sound includes portions of the sound reflected by the user's tympanic membrane.

Processing system 114 may apply a machine learned (ML) model to determine, based on the sensor data, an applicable fitting category of hearing instrument 102A from among a plurality of predefined fitting categories. The fitting categories may correspond to different ways of wearing hearing instrument 102A. For instance, the plurality of predefined fitting categories may include a fitting category corresponding to a correct way of wearing the hearing instrument 102A and one or more fitting categories corresponding to incorrect ways of wearing hearing instrument 102A.

Processing system 114 may generate an indication based on the applicable fitting category. For example, processing system 114 may cause speaker 108A to generate an audible indication based on the applicable fitting category. In another example, processing system 114 may output the indication for display in a user interface of an output device (e.g., a smartphone, tablet computer, personal computer, etc.). In some examples, processing system 114 may cause hearing instrument 102A or another device to provide haptic stimulus indicating the application fitting category. The indication based on the applicable fitting category may specify the applicable fitting category. In some examples, the indication based on the applicable fitting category may include category-specific instructions that instruct user 104 how to move hearing instrument 102A from the applicable fitting category to the correct way of wearing hearing instrument 102A.

FIG. 2 is a block diagram illustrating example components of hearing instrument 102A, in accordance with one or more aspects of this disclosure. Hearing instrument 102B may include the same or similar components of hearing instrument 102A shown in the example of FIG. 2. In the example of FIG. 2, hearing instrument 102A comprises one or more storage devices 202, one or more communication units 204, a receiver 206, one or more processors 112A, one or more microphones 210, sensors 118A, a power source 214, and one or more communication channels 216. Communication channels 216 provide communication between storage devices 202, communication unit(s) 204, receiver 206, processor(s) 208, microphone(s) 210, and sensors 118A. Storage devices 202, communication units 204, receiver 206, processors 112A, microphones 210, and sensors 118A may draw electrical power from power source 214.

In the example of FIG. 2, each of storage devices 202, communication units 204, receiver 206, processors 112A, microphones 210, sensors 118A, power source 214, and communication channels 216 are contained within a single housing 218. Thus, in such examples, each of storage devices 202, communication units 204, receiver 206, processors 112A, microphones 210, sensors 118A, power source 214, and communication channels 216 may be within in-ear assembly 116A of hearing instrument 102A. However, in other examples of this disclosure, storage devices 202, communication units 204, receiver 206, processors 112A, microphones 210, sensors 118A, power source 214, and communication channels 216 may be distributed among two or more housings. For instance, in an example where hearing instrument 102A is a RIC device, receiver 206, one or more of microphones 210, and one or more of sensors 118A may be included in an in-ear housing separate from a behind-the-ear housing that contains the remaining components of hearing instrument 102A. In such examples, a RIC cable may connect the two housings.

In the example of FIG. 2, sensors 118A include an inertial measurement unit (IMU) 226 that is configured to generate data regarding the motion of hearing instrument 102A. IMU 226 may include a set of sensors. For instance, in the example of FIG. 2, IMU 226 includes one or more accelerometers 228, a gyroscope 230, a magnetometer 232, combinations thereof, and/or other sensors for determining the motion of hearing instrument 102A.

In the example of FIG. 2, sensors 118A of hearing instrument 102A may include one or more of a temperature sensor 236, an electroencephalography (EEG) sensor 238, an electrocardiograph (ECG) sensor 240, a photoplethysmography (PPG) sensor 242, and a capacitance sensor 243. Furthermore, in the example of FIG. 2, hearing instrument 102A may include additional sensors 244, such as blood oximetry sensors, blood pressure sensors, environmental pressure sensors, environmental humidity sensors, skin galvanic response sensors, and/or other types of sensors. In other examples, hearing instrument 102A and sensors 118A may include more, fewer, or different components.

Storage device(s) 202 may store data. Storage device(s) 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 202 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Communication unit(s) 204 may enable hearing instrument 102A to send data to and receive data from one or more other devices, such as a device of computing system 106 (FIG. 1), another hearing instrument (e.g., hearing instrument 102B), an accessory device, a mobile device, or another types of device. Communication unit(s) 204 may enable hearing instrument 102A to use wireless or non-wireless communication technologies. For instance, communication unit(s) 204 enable hearing instrument 102A to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 102A to communicate using a cable-based technology, such as a Universal Serial Bus (USB) technology.

Receiver 206 comprises one or more speakers for generating audible sound.

Microphone(s) 210 detect incoming sound and generate one or more electrical signals (e.g., an analog or digital electrical signal) representing the incoming sound.

Processor(s) 208 may be processing circuits configured to perform various activities. For example, processor(s) 208 may process signals generated by microphone(s) 210 to enhance, amplify, or cancel-out particular channels within the incoming sound. Processor(s) 208 may then cause receiver 206 to generate sound based on the processed signals. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data to computing system 106. Furthermore, communication unit(s) 204 may receive audio data from computing system 106 and processor(s) 208 may cause receiver 206 to output sound based on the audio data.

In the example of FIG. 2, receiver 206 includes speaker 108A. Speaker 108A may generate a sound that includes a range of frequencies. Speaker 108A may be a single speaker or one of a plurality of speakers in receiver 206. For instance, receiver 206 may also include "woofers" or "tweeters" that provide additional frequency range. In some examples, speaker 108A may be implemented as a plurality of speakers.

Furthermore, in the example of FIG. 2, microphones 210 include a microphone 110A. Microphone 110A may measure an acoustic response to the sound generated by speaker 108A. In some examples, microphones 210 include multiple microphones. Thus, microphone 110A may be a first microphone and microphones 210 may also include a second, third, etc. microphone. In some examples, microphones 210 include microphones configured to measure sound in an auditory environment of user 104. In some examples, one or more of microphones 210 in addition to microphone 110A may measure the acoustic response to the sound generated by speaker 108A. In some examples, processing system 114 may subtract the acoustic response generated by the first microphone from the acoustic response generated by the second microphone in order to help identify a notch frequency. The notch frequency is a frequency in the range of frequencies having a level that is attenuated in the acoustic response relative to levels in the acoustic response of frequencies surrounding the frequency. As described elsewhere in this disclosure, the notch frequency may be used to determine an insertion depth of in-ear assembly 116A of hearing instrument 102A.

In some examples, microphone 110A is detachable from hearing instrument 102A. Thus, after the fitting process is complete and user 104 is familiar with how in-ear assembly 116A of hearing instrument 102A should be inserted into the user's ear canal, microphone 110A may be detached from hearing instrument 102A. Removing microphone 110A may decrease the size of in-ear assembly 116A of hearing instrument 102A and may increase the comfort of user 104.

In some examples, an earbud is positioned over the tips of speaker 108A and microphone 110A. In the context of this disclosure, an earbud is a flexible, rigid, or semi-rigid component that is configured to fit within an ear canal of a user. The earbud may protect speaker 108A and microphone 110A from earwax. Additionally, the earbud may help to hold in-ear assembly 116A in place. The earbud may comprise a biocompatible, flexible material, such as a silicone material, that fits snugly into the ear canal of user 104.

In the example of FIG. 2, storage device(s) 202 may store an ML model 246. As described in greater detail elsewhere in this disclosure, processing system 114 (e.g., processors 112A and/or other processors) may apply ML model 246 to determine, based on sensor data generated by sensors 118 (e.g., sensors 118A), an applicable fitting category for hearing instrument 102A from among a plurality of predefined fitting categories.

FIG. 3 is a block diagram illustrating example components of computing device 300, in accordance with one or more aspects of this disclosure. FIG. 3 illustrates only one particular example of computing device 300, and many other example configurations of computing device 300 exist. Computing device 300 may be a computing device in computing system 106 (FIG. 1).

As shown in the example of FIG. 3, computing device 300 includes one or more processors 302, one or more communication units 304, one or more input devices 308, one or more output device(s) 310, a display screen 312, a power source 314, one or more storage device(s) 316, and one or more communication channels 318. Computing device 300 may include other components. For example, computing device 300 may include physical buttons, microphones, speakers, communication ports, and so on.

Communication channel(s) 318 may interconnect each of components 302, 304, 308, 310, 312, and 316 for inter-component communications (physically, communicatively, and/or operatively). In some examples, communication channel(s) 318 may include a system bus, a network connection, an inter-process communication data structure, or any other method for communicating data. Power source 314 may provide electrical energy to components 302, 304, 308, 310, 312 and 316.

Storage device(s) 316 may store information required for use during operation of computing device 300. In some examples, storage device(s) 316 have the primary purpose of being a short-term and not a long-term computer-readable storage medium. Storage device(s) 316 may be volatile memory and may therefore not retain stored contents if powered off. Storage device(s) 316 may be configured for long-term storage of information as non-volatile memory space and retain information after power on/off cycles. In some examples, processor(s) 302 on computing device 300 read and may execute instructions stored by storage device(s) 316.

Computing device 300 may include one or more input devices 308 that computing device 300 uses to receive user input. Examples of user input include tactile, audio, and video user input. Input device(s) 308 may include presence-sensitive screens, touch-sensitive screens, mice, keyboards, voice responsive systems, microphones or other types of devices for detecting input from a human or machine.

Communication unit(s) 304 may enable computing device 300 to send data to and receive data from one or more other computing devices (e.g., via a communications network, such as a local area network or the Internet). For instance, communication unit(s) 304 may be configured to receive data sent by hearing instrument(s) 102, receive data generated by user 104 of hearing instrument(s) 102, receive and send request data, receive and send messages, and so on. In some examples, communication unit(s) 304 may include wireless transmitters and receivers that enable computing device 300 to communicate wirelessly with the other computing devices. For instance, in the example of FIG. 3, communication unit(s) 304 include a radio 306 that enables computing device 300 to communicate wirelessly with other computing devices, such as hearing instruments 102 (FIG. 1). Examples of communication unit(s) 304 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing device 300 may use communication unit(s) 304 to communicate with one or more hearing instruments (e.g., hearing instruments 102 (FIG. 1, FIG. 2)). Additionally, computing device 300 may use communication unit(s) 304 to communicate with one or more other remote devices.

Output device(s) 310 may generate output. Examples of output include tactile, audio, and video output. Output device(s) 310 may include presence-sensitive screens, sound cards, video graphics adapter cards, speakers, liquid crystal displays (LCD), or other types of devices for generating output. Output device(s) 310 may include display screen 312.

Processor(s) 302 may read instructions from storage device(s) 316 and may execute instructions stored by storage device(s) 316. Execution of the instructions by processor(s) 302 may configure or cause computing device 300 to provide at least some of the functionality ascribed in this disclosure to computing device 300. As shown in the example of FIG. 3, storage device(s) 316 include computer-readable instructions associated with operating system 320, application modules 322A-322N (collectively, "application modules 322"), and a companion application 324.

Furthermore, in the example of FIG. 3, storage device(s) 316 may store ML model 246. As described in greater detail elsewhere in this disclosure, processing system 114 (e.g., processors 302 and/or other processors) may apply ML model 246 to determine, based on sensor data generated by sensors 118 (e.g., sensors 118A), an applicable fitting category for hearing instrument 102A from among a plurality of predefined fitting categories. ML model 246 is illustrated in both FIG. 2 and FIG. 3 to illustrate that ML model 246 may be implemented in one or more of hearing instruments 102 and/or a computing device other than hearing instruments 102, such as computing device 300.

Execution of instructions associated with operating system 320 may cause computing device 300 to perform various functions to manage hardware resources of computing device 300 and to provide various common services for other computer programs. Execution of instructions associated with application modules 322 may cause computing device 300 to provide one or more of various applications (e.g., "apps," operating system applications, etc.). Application modules 322 may provide applications, such as text messaging (e.g., SMS) applications, instant messaging applications, email applications, social media applications, text composition applications, and so on.

Execution of instructions associated with companion application 324 by processor(s) 302 may cause computing device 300 to perform one or more of various functions. For example, execution of instructions associated with companion application 324 may cause computing device 300 to configure communication unit(s) 304 to receive data from hearing instruments 102 and use the received data to present data to a user, such as user 104 or a third-party user. In some examples, companion application 324 is an instance of a web application or server application. In some examples, such as examples where computing device 300 is a mobile device or other type of computing device, companion application 324 may be a native application.

In some examples, companion application 324 may apply ML model 246 to determine, based on sensor data from sensors 118 (e.g., sensors 118A, sensors 118B, and/or other sensors), an applicable fitting category of a hearing instrument (e.g., hearing instrument 102A or hearing instrument 102B) from among a plurality of predefined fitting categories. Furthermore, in some examples, companion application 324 may generate an indication based on the applicable fitting category of the hearing instrument. For example, companion application 324 may output, for display on display screen 312, a message that includes the indication. In some examples, companion application 324 may send data to a hearing instrument (e.g., one of hearing instruments 102) that causes the hearing instrument to output an audible and/or tactile indication based on the applicable fitting category. In some examples, such as examples where computing device 300 is a server device, companion application 324 may send a notification (e.g., a text message, email message, push notification message, etc.) to a device (e.g., a mobile phone, smart watch, remote control, tablet computer, personal computer, etc.) associated with the applicable fitting category.

Figure 4:
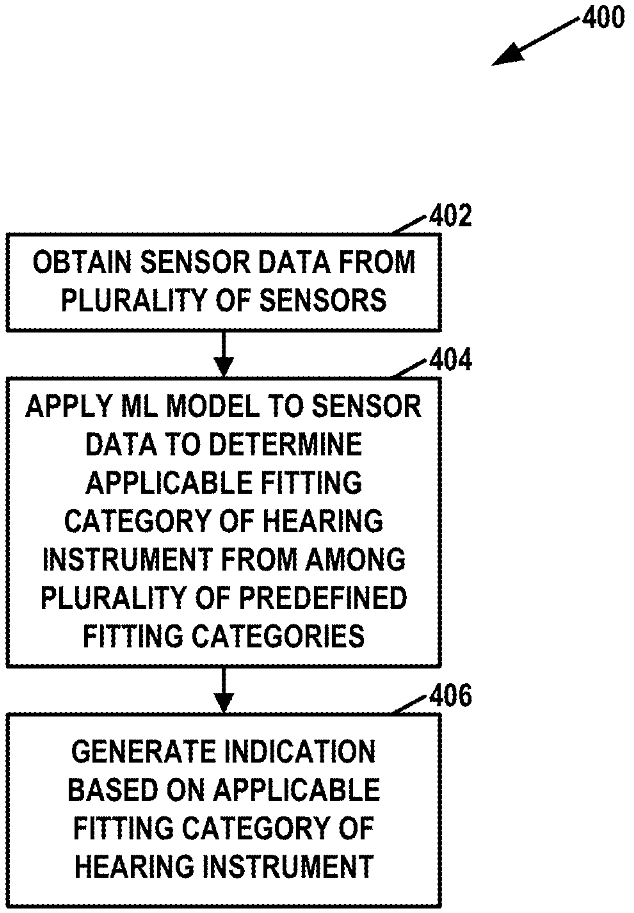
FIG. 4 is a flowchart illustrating an example fitting operation in accordance with one or more aspects of this disclosure.

FIG. 4 is a flowchart illustrating an example fitting operation 400, in accordance with one or more aspects of this disclosure. Other examples of this disclosure may include more, fewer, or different actions. Although this disclosure describes FIG. 4 with reference to hearing instrument 102A, operation 400 may be performed in the same way with respect to hearing instrument 102B, or another hearing instrument. Furthermore, although this disclosure describes FIG. 4 with reference to FIGS. 1-3, the techniques of this disclosure are not so limited. For instance, FIG. 4 may be applicable in examples where ML model 246 is implemented in one or more of hearing instruments 102 and/or two or more computing devices, or combinations of computing devices and hearing instruments 102.

The fitting operation 400 of FIG. 4 may begin in response to one or more different types of events. For example, user 104 may initiate fitting operation 400. For instance, user 104 may initiate fitting operation 400 using a voice command or by providing appropriate input to a device (e.g., a smartphone, accessory device, or other type of device). In some examples, processing system 114 automatically initiates fitting operation 400. For instance, in some examples, processing system 114 may automatically initiate fitting operation 400 on a periodic basis. Furthermore, in some examples, processing system 114 may use a determination of a depth of insertion of in-ear assembly 116A of hearing instrument 102A for a fixed or variable amount of time before automatically initiating fitting operation 400 again. In some examples, fitting operation 400 may be performed a specific number of times before processing system 114 determines that results of fitting operation 400 are acceptable. For instance, after fitting operation 400 has been performed a specific number of times with user 104 achieving a proper depth of insertion of in-ear assembly 116A of hearing instrument 102A, processing system 114 may stop automatically initiating fitting operation 400. In other words, after several correct placements of hearing instrument 102A, processing system 114 may stop automatically initiating fitting operation 400 or may phase out initiating fitting operation 400 over time. Thus, in some examples, processing system 114 may determine, based on a history of attempts by user 104 to insert in-ear assembly 116A of hearing instrument 102A into the ear canal of user 104 (e.g., based on a history of successfully achieving a fitting category corresponding to correctly wearing hearing instrument 102A), whether to initiate the fitting process.

In some examples where hearing instruments 102 include rechargeable power sources (e.g., when power source 214 (FIG. 2) is rechargeable), processing system 114 may automatically initiate fitting operation 400 in response to detecting that one or more of hearing instruments 102 have been removed from a charger, such as a charging case. In some examples, processing system 114 may detect that one or more of hearing instruments 102 have been removed from the charger by detecting an interruption of an electrical current between the charger and one or more of hearing instruments 102. Furthermore, in some examples, processing system 114 may automatically initiate fitting operation 400 in response to determining that one or more of hearing instruments 102 are in contact with the ears of user 104. In this example, processing system 114 may determine that one or more of hearing instruments 102 are in contact with the ears of user 104 based on signals from one or more capacitive switches or other sensors of hearing instruments 102. Thus, in this way, processing system 114 may determine whether an initiation event has occurred. Example types of initiation events may include one or more of removal of one or more of hearing instruments 102 from a charger, contact of the in-ear assembly of a hearing instrument with skin, or detecting that the hearing instrument is on an ear of a user (e.g., using positional sensors, using wireless communications, etc.).

In some examples, processing system 114 may automatically initiate fitting operation 400 in response to determining that one or more of hearing instruments 102 are generally positioned in the ears of user 104. For example, processing system 114 may automatically initiate fitting operation 400 in response to determining, based on signals from IMUs (e.g., IMU 226) of hearing instruments 102, that hearing instruments 102 are likely positioned on the head of user 104. For instance, in this example, if the IMU signals indicate synchronized motion in one or more patterns consistent with movements of a human head (e.g., nodding, rotating, tilting, head movements associated with walking, etc.), processing system 114 may determine that hearing instruments 102 are likely positioned on the head of user 104.

In some examples, processing system 114 may automatically initiate fitting operation 400 in response to determining, based on wireless communication signals exchanged between hearing instruments 102, that hearing instruments 102 are likely positioned on the head of user 104. For instance, in this example, processing system 114 may determine that hearing instruments 102 are likely positioned on the head of user 104 when hearing instruments 102 are able to wirelessly communicate with each other (and, in some examples, an amount of signal attenuation is consistent with communication between hearing instruments positioned on opposite ears of a human head). In some examples, processing system 114 may determine that hearing instruments 102 are generally positioned on the head of user 104 based on a combination of factors, such as IMU signals indicating synchronized motion in one or more patterns consistent with movements of the human head and hearing instruments 102 being able to wirelessly communicate with each other. In some examples, processing system 114 may determine that hearing instruments 102 are generally positioned on the head of user 104 based on a specific time delay for wireless communication between hearing instruments 102.

In the example of FIG. 4, processing system 114 may obtain sensor data from a plurality of sensors 118 belonging to a plurality of sensor types (402). For example, processing system 114 may obtain sensor data from two or more of IMU 226, temperature sensor 236, EEG sensor 238, ECG sensor 240, PPG sensor 242, capacitance sensor 243, or additional sensors 244. One or more of sensors 118 may be included in hearing instrument 102A, 102B, or another device.

In some examples where hearing instrument 102A includes in-ear assembly 116A and a behind-the-ear assembly, a cable may connect in-ear assembly 116A and the behind-the-ear assembly. In some such examples, the sensors may include one or more sensors directly attached to the cable. For instance, the sensors directly attached to the cable may include a temperature sensor. Time series sensor data from the temperature sensor attached to the cable may have different patterns depending on whether the cable is medial to the pinna (which is correct) or lateral to the pinna (which is incorrect). Moreover, time series sensor data from the temperature sensor attached to the cable may have different patterns depending on whether the temperature sensor has skin contact (which is correct) or no skin contact (which is incorrect). Other sensors that may be attached to the cable may include light sensors, accelerometers, electrodes, capacitance sensors, and other types of devices.

The temperature sensors may include one or more thermistors (i.e., thermally sensitive resistors), resistance temperature detectors, thermocouples, semi-conductor-based sensors, infrared sensors, and the like. In some hearing instruments, a temperature sensor of a hearing instrument may warm up over time (e.g., over the course of 20 minutes) to reach a baseline temperature. The baseline temperature may be a temperature at which the temperature stops rising. The rate of warming prior to arriving at the baseline temperature may be related to whether or not hearing instrument 102A is worn correctly. For instance, the rate of warming may be faster if in-ear assembly 116A of hearing instrument 102A is inserted deeply enough into an ear of user 104 as compared to when in-ear assembly 116A of hearing instrument 102A is not inserted deeply enough into the ear of user 104.

In some examples where sensors 118 include one or more IMUs (e.g., IMU 226), the data generated by the IMUs may have different characteristics depending on a posture of user 104. For instance, IMU 226 may include one or more accelerometers to detect linear acceleration and a gyroscope (e.g., a 3, 6, or 9 axis gyroscope) to detect rotational rate. In this way, IMU 226 may be sensitive to changes in the placement of hearing instrument 102A. IMU 226 may be sensitive to hearing instrument 102A being moved and adjusted in a 3-dimensional space.

In some examples, IMU 226 may be calibrated to a postural state of user 104, e.g., to improve accuracy of IMU 226 relative to an ear of user 104. Accordingly, processing system 114 may obtain information regarding a posture of user 104 and use the information regarding the posture of user 104 to calibrate IMU 226. For instance, processing system 114 may obtain information regarding the posture of user 104 via a user interface used by user 104 or another user. In some examples, processing system 114 may provide the posture as input to a ML model for determining the applicable fitting category. In some examples, processing system 114 may use different ML models for different types of posture to determine the applicable fitting category.

Figure 5:
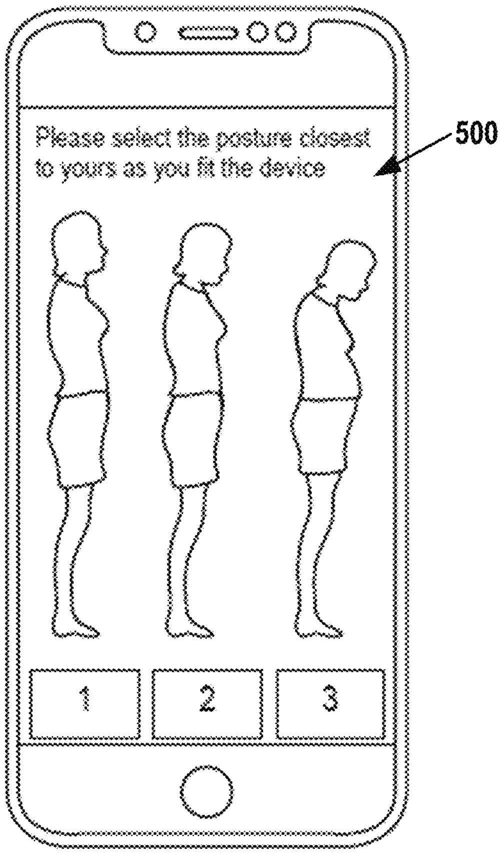
FIG. 5 is a conceptual diagram of an example user interface for selecting a posture, in accordance with one or more aspects of this disclosure.

FIG. 5 is a conceptual diagram of an example user interface 500 for selecting a posture, in accordance with one or more aspects of this disclosure. In the example of FIG. 5, a user (e.g., user 104) may select among three different types of postures that user 104 may have while user 104 is fitting hearing instrument 102A.

In some examples, sensors 118 may include one or more inward-facing microphones, such as one or more of microphones 210 (FIG. 2). Processing system 114 may use signals generated by the inward-facing microphones for own-voice detection. In other words, processing system 114 may use signals generated by the inward-facing microphones to detect the voice of user 104. In accordance with a technique of this disclosure, processing system 114 may use signals generated by the inward-facing microphones to determine whether in-ear assembly 116A of hearing instrument 102A has occluded an ear canal of user 104. Full occlusion of the ear canal of user 104 may be associated with a correct way of wearing in-ear assembly 116A of hearing instrument 102A. To determine whether in-ear assembly 116A has occluded the ear canal of user 104, processing system 114 may analyze the signals generated by the inward-facing microphones to determine clarity of vocal sounds of user 104. In general, the inward-facing microphones are able to detect the vocal sounds of user 104 with greater clarity when in-ear assembly 116A of hearing instrument 102A has occluded the ear canal of user 104. In some examples, processing system 114 may determine the clarity as one or more of amplitude of the vocal sounds, a signal-to-noise ratio of voice sounds, and/or other data. Thus, processing system 114 may determine, based on the clarity of the vocal sounds of user 104, whether in-ear assembly 116A of hearing instrument 102A has occluded the ear canal of user 104. For instance, if processing system 114 determines that the clarity of the vocal sounds of user 104 is greater than a specific threshold, processing system 114 may determine that in-ear assembly 116A of hearing instrument 102A has occluded the ear canal of user 104.

In some examples, speaker 108A (FIG. 1) of hearing instrument 102A may emit a sound. Inward-facing microphones may detect the sound emitted by speaker 108A. Processing system 114 may use signals generated by inward-facing microphones to estimate an amount of low-frequency leakage. As part of estimating the amount of low-frequency leakage, processing system 114 may determine an amount of energy in a low-frequency range (e.g., less than or equal to approximately 1000 Hz, e.g., 50 Hz to 500 Hz or another range) of the signals generated by the inward-facing microphones. Processing system 114 may then compare the amount of energy in the low-frequency range of the signals generated by the inward-facing microphones to the amount of energy in the low-frequency range of signals generated by outward-facing microphones of hearing instrument 102A. The difference between the amounts of energy may be equal to the amount of low-frequency leakage. Processing system 114 may determine an insertion depth of in-ear assembly 116A into an ear canal of user 104 based on the amount of low-frequency leakage. Insertion depth of in-ear assembly 116A may be an important aspect of fitting hearing instrument 102A.

Figure 6:
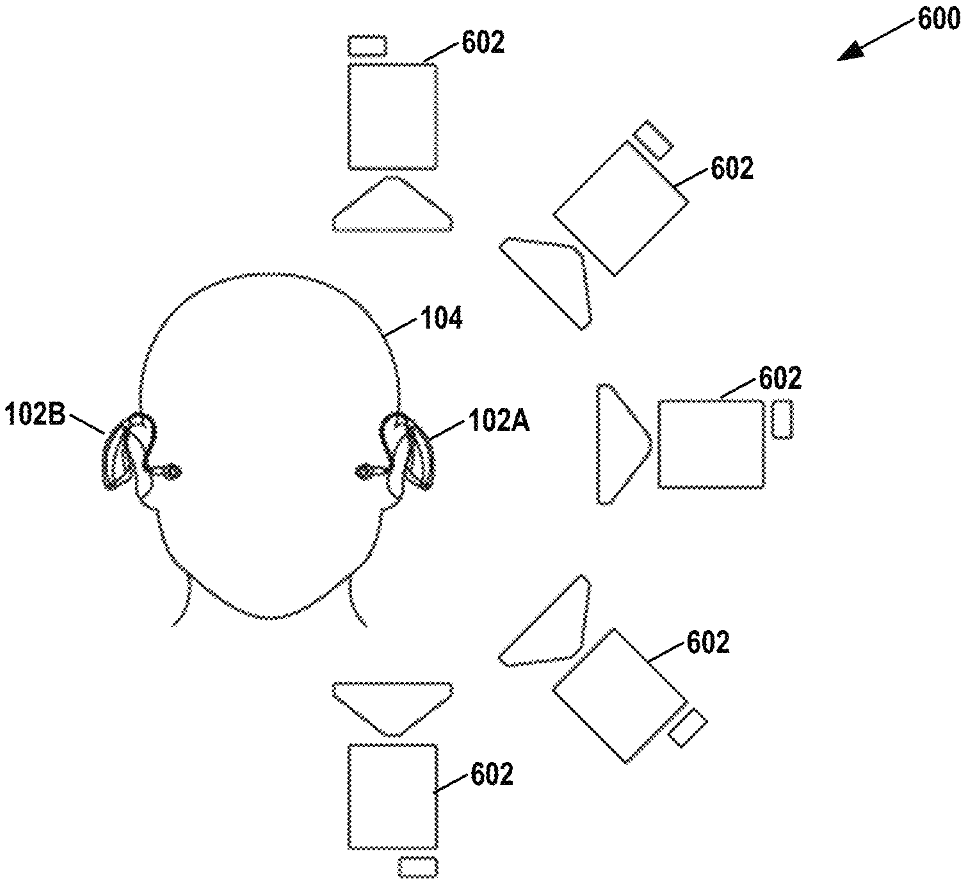
FIG. 6 is a conceptual diagram illustrating an example camera-based system for determining a fitting category for a hearing instrument, in accordance with one or more aspects of this disclosure.

In some examples, sensors 118 may include one or more cameras. FIG. 6 is a conceptual diagram illustrating an example camera-based system 600 for determining a fitting category for a hearing instrument, in accordance with one or more aspects of this disclosure. In the example of FIG. 6, camera-based system 600 includes one or more cameras 602. An optimal camera angle for determining a fitting category of hearing instrument 102A may vary depending on a form factor of specific devices that includes one or more of cameras 602. In some examples, use of video from multiple camera angles may improve determination of the fitting category. For instance, video from a camera positioned directly medial to the ear of user 104 and video from a camera posterior to the ear of user 104 may improve determination of the fitting category.

In some examples, sensors 118 include one or more PPG sensors (e.g., PPG sensor 242 (FIG. 2). PPG sensor 242 may include a light emitter (e.g., one or more light emitting diodes (LEDs), laser diodes, etc.) configured to emit light into the skin of user 104. PPG sensor 242 may also include a light detector (e.g., photosensor, photon detector, etc.) configured to receive light produced by the light emitter reflected back through the skin of user 104. Based on modulated patterns of the reflected signals, processing system 114 may analyze various physiological signals, such as heart rate, pulse oximetry, and respiration rate, among others.

Processing system 114 may also use the amplitude of the signal modulations to determine whether user 104 is wearing a hearing instrument correctly. For instance, PPG data may be optimal when PPG sensor 242 is placed directly against the skin of user 104, and the signal may be degraded if the placement varies (e.g., there is an air gap between PPG sensor 242 and the skin of user 104, PPG sensor 242 is angled relative to the skin of user 104, etc.).

Figure 7:
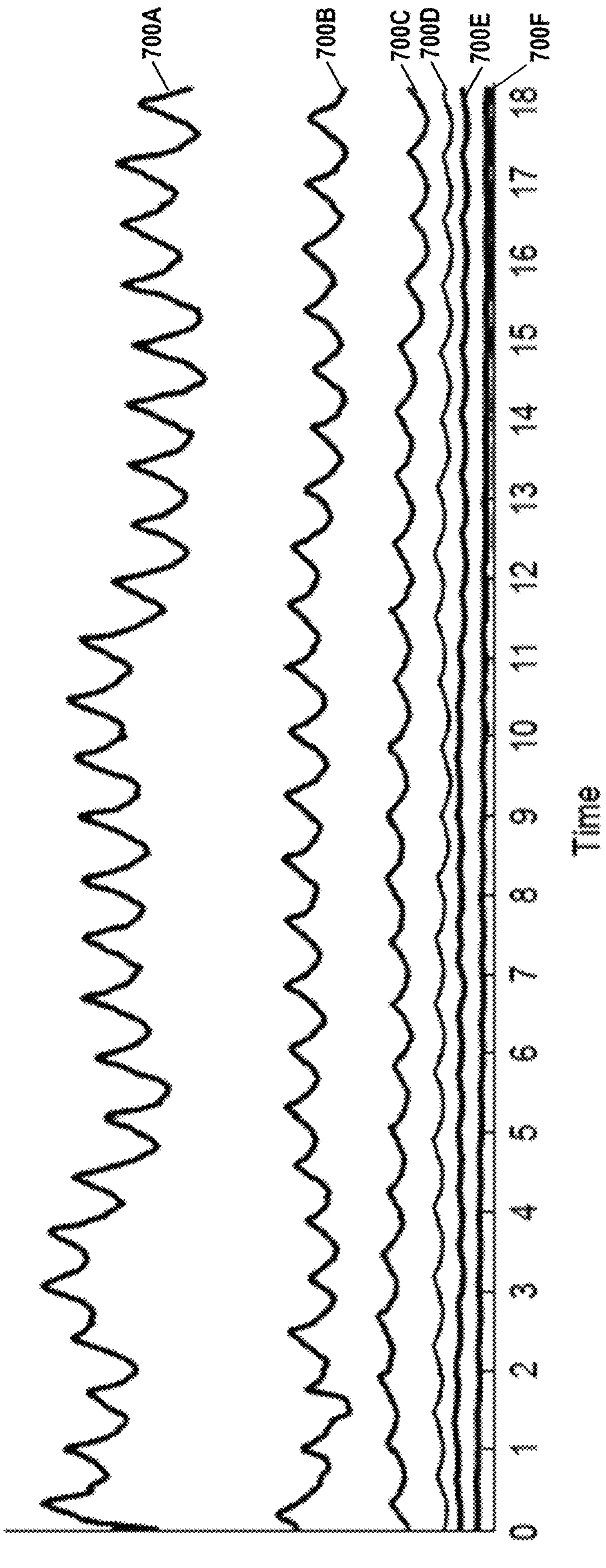
FIG. 7 is a chart illustrating example photoplethysmography (PPG) signals, in accordance with one or more aspects of this disclosure.

FIG. 7 is a chart illustrating example PPG signals, in accordance with one or more aspects of this disclosure. More specifically, FIG. 7 shows a series of PPG signals 700A-700F (collectively, "PPG signals 700"). In the example of FIG. 7, PPG signals 700 are arranged from top to bottom in an order corresponding to decreasing signal strength, where signal strength is measured in terms of amplitude of modulations. PPG signals 700 are arranged in this order in FIG. 7 to avoid signal overlay. Signal strength may correspond to correct placement of hearing instruments 102. In other words, high signal strength may correspond to correct placement of hearing instruments 102 while low signal strength may correspond to incorrect placement of hearing instruments 102. For instance, in an example in which in-ear assembly 116A of hearing instrument 102A includes PPG sensor 242, and PPG sensor 242 is not properly aligned with a posterior side of the tragus, a signal generated by PPG sensor 242 may be relatively weak. Thus, user 104 may be wearing hearing instrument 102A too shallowly and may need to insert in-ear assembly 116A more deeply into an ear canal of user 104 so that a window of PPG sensor 242 is in better contact with the tragus.

In some examples where processing system 114 uses one or more PPG signals as indicators of whether user 104 is wearing hearing instruments 102 correctly, the PPG signals may be calibrated based on the skin tone of user 104. Darker skin tones naturally reduce the PPG signal due to additional absorption of light by the skin. Thus, calibrating the PPG signals may increase accuracy across users with different skin tones. Calibration may be achieved by user 104 selecting their skin tone (e.g., Fitzpatrick skin type) using an accessory device (e.g., a mobile phone, tablet computer, etc.). In some examples, skin tone is automatically detected based on data generated by a camera (e.g., camera 602 of FIG. 6) or other optical detector operatively connected to hearing instruments 102 or another device.

In some examples, sensors 118 include one or more EEG sensors, such as EEG sensor 238 (FIG. 2). EEG sensor 238 may include one or more electrodes configured to measure neural electrical activity. EEG sensor 238 may generate an EEG signal based on the measured neural electrical activity. EEG signals may have different characteristics depending on whether EEG sensor 238 is in contact with the skin of user 104 as compared to when EEG sensor 238 is not in contact with the skin of user 104. For example, when EEG sensor 238 is in contact with the skin of user 104, the EEG signal typically contains movement-related spikes in electrical activity. The movement-related spikes in electrical activity may correspond to increased electrical activity corresponding to movement of user 104. Processing system 114 may correlate the movement-related spikes in electrical activity with sensor data from one or more IMUs of hearing instruments 102 (e.g., IMU 226 of hearing instrument 102A) showing movement. However, when EEG sensor 238 is not in contact with the skin of user 104, the EEG signal does not contain movement-related spikes in electrical activity. However, the sensor data from the IMUs of hearing instruments 102 may still indicate movement of user 104. Thus, processing system 114 being unable to correlate movements indicated by the sensor data from the IMUs with movement-related spikes in electrical activity in the EEG signal may indicate that EEG sensor 238 is not in contact with the skin of user 104. Because the EEG sensor is in contact with the skin of user 104 when user 104 is wearing a hearing instrument containing EEG sensor 238 correctly, being unable to correlate movements indicated by the sensor data from the IMUs with movement-related spikes in electrical activity in the EEG signal may indicate that user 104 is not wearing the hearing instrument correctly.

In some examples, sensors 118 include one or more ECG sensors, such as ECG sensor 240 of FIG. 2. ECG sensor 240 may include one or more electrodes configured to measure cardiac activity, e.g., by measuring electrical activity associated with cardiac activity. ECG sensor 240 may generate an ECG signal based on the measured cardiac activity. Processing system 114 may determine various parameters of cardiac activity, such as heart rate and heart rate variability, based on the ECG signal.

The ECG signal may differ depending on whether ECG sensor 240 is in contact with the skin of user 104 as compared to when ECG sensor 240 is not in contact with the skin of user 104. Generally, when ECG sensor 240 is in contact with the skin of user 104 with appropriate coupling, the ECG signal contains sharp peaks corresponding to cardiac muscle contractions (i.e., heart beats). Because these peaks are sharp and occur at consistent timing, it may be relatively easy for processing system 114 to auto-detect the peaks even in the presence of noise. If processing system 114 is unable to identify peaks corresponding to muscle contractions, processing system 114 may determine that ECG sensor 240 is not properly placed against the skin of user 104 and/or debris is preventing ECG sensor 240 from measuring the electrical activity associated with cardiac activity.

Figure 8:
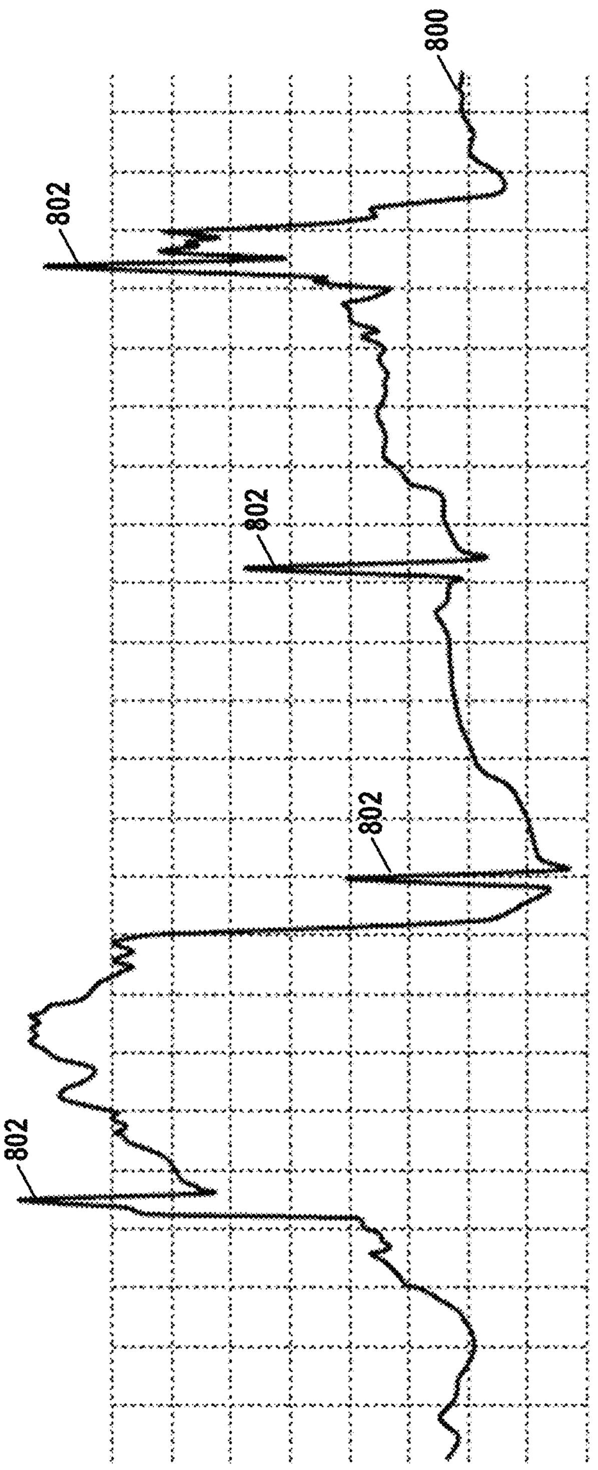
FIG. 8 is a chart illustrating an example electrocardiogram (ECG) signal, in accordance with one or more aspects of this disclosure.

FIG. 8 is a chart illustrating an example ECG signal 800, in accordance with one or more aspects of this disclosure. In the example of FIG. 8, ECG signal 800 includes peaks 802 that correspond to cardiac muscle contractions. As can be seen in FIG. 8, peaks 802 are identifiable despite changes in the overall amplitude of ECG signal 800 attributable to noise.

With continued reference to FIG. 4, processing system 114 may apply ML model 246 to the sensor data, to determine, based on the sensor data (e.g., from two or more of sensors 118), an applicable fitting category of hearing instrument 102A from among a plurality of predefined fitting categories (404). The plurality of predefined fitting categories includes a fitting category corresponding to a correct way of wearing hearing instrument 102A and a fitting category corresponding to an incorrect way of wearing hearing instrument 120A.

Figure 9A:
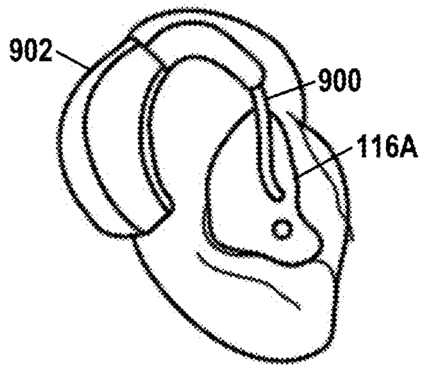
FIG. 9A, FIG. 9B, FIG. 9C, and FIG. 9D are conceptual diagrams illustrating example fitting categories that correspond to incorrect ways of wearing a hearing instrument.
Figure 9B:
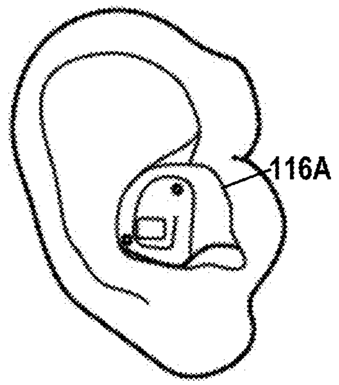
Figure 9C:
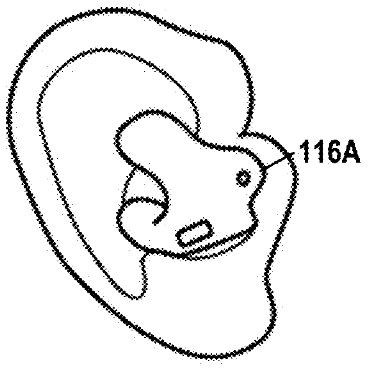
Figure 9D:
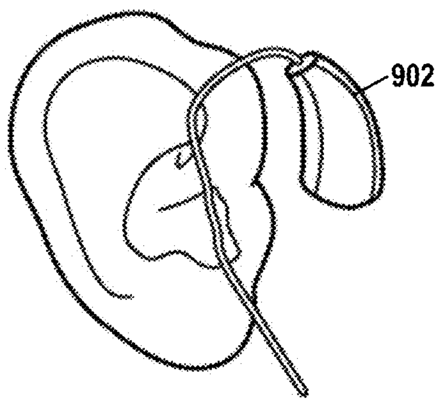

FIG. 9A, FIG. 9B, FIG. 9C, and FIG. 9D are conceptual diagrams illustrating example fitting categories that correspond to incorrect ways of wearing hearing instrument 102A. More specifically, the example of FIG. 9A illustrates an example way of wearing hearing instrument 102A such that a cable 900 connecting a behind-the-ear assembly 902 of hearing instrument 102A and in-ear assembly 116A of hearing instrument 102A is not medial of a pinna of an ear of user 104. The fitting category shown in FIG. 9A may be referred to herein as the "dangling" fitting category. In other words, cable 900 is not supported by the ear of user 104. FIG. 9B illustrates an example way of wearing hearing instrument 102A in a way that in-ear assembly 116A of hearing instrument 102A is at a position that is too shallow in an ear canal of user 104. FIG. 9C illustrates an example way of wearing hearing instrument 102A in an incorrect orientation. For instance, in FIG. 9C, hearing instrument 102A may be upside down or backward. FIG. 9D illustrates an example way of wearing hearing instrument 102A in an incorrect ear of user 104.

As mentioned above, processing system 114 may apply ML model 246 to determine the applicable fitting category of hearing instrument 102A. ML model 246 may be implemented in one of a variety of ways. For example, ML model 246 may be implemented as a neural network, a k-means clustering model, a support vector machine, or another type of machine learning model.

Processing system 114 may process the sensor data to generate input data, which processing system 114 provides as input to ML model 246. For example, processing system 114 may determine a rate of warming based on temperature measurements generated by a temperature sensor. In this example, processing system 114 may use the rate of warming as input to ML model 246. In some examples, processing system 114 may obtain motion data from an IMU. In this example, processing system 114 may apply a transform (e.g., a fast Fourier transform) to samples of the motion data to determine frequency coefficients. In this example, processing system 114 may classify the motion of hearing instrument 102A based on ranges of values of the frequency coefficients. Processing system 114 may then provide data indicating the classification of the motion of hearing instrument 102A to ML model 246 as input. In some examples, processing system 114 may determine, based on signals from inward-facing microphones, a clarity value indicating a level of clarity of the vocal sounds of user 104. In this example, processing system 114 may provide the clarity value as input to ML model 246. In some examples, processing system 114 may use sound emitted by speakers of hearing instrument 102A to determine an insertion depth of in-ear assembly 116A of hearing instrument 102A. Processing system 114 may provide the insertion depth as input to ML model 246.

In some examples, processing system 114 may implement an image classification system, such as a convolutional neural network, that is trained to classify images according to fitting category. In such examples, processing system 114 may receive image data from one or more cameras, such as cameras 602. In some such examples, processing system 114 may provide the output of the image classification system as input to ML model 246. In some examples, processing system 114 may provide the image data directly as input to ML model 246.

In some examples, processing system 114 may determine a signal strength of a signal generated by PPG sensor 242. In such examples, processing system 114 may use the signal strength as input to ML model 246. Moreover, in some examples, processing system 114 may generate data regarding correlation between movements of user 104 and EEG signals and provide the data as input to ML model 246. In some examples, processing system 114 may process ECG signals to generate data regarding peaks in the ECG (e.g., amplitude of peaks, occurrence of peaks, etc.) and provide this data as input to ML model 246.

In an example where ML model 246 includes a neural network, the neural network may include input neurons for each piece of input data. Additionally, the neural network may include output neurons for each fitting category. For instance, there may be an output neuron for the fitting category corresponding to a correct way of wearing hearing instrument 102A and output neurons for each of the fitting categories shown in the examples of FIG. 9A, FIG. 9B, FIG. 9C, and FIG. 9D. The neural network may include one or more hidden layers. An output neuron may generate output values (e.g., confidence values) corresponding to confidence levels that the applicable fitting category is the fitting category corresponding to the output neuron.

In an example where ML model 246 includes a k-means clustering model, there may be a different centroid for each of the fitting categories. In this example, processing system 114 may determine, based on input data (which is based on the sensor data), a current point in a vector space. The number of dimensions of the vector space may be equal to the number of pieces of data in the input data. The current point may be defined by the values of the input data. Furthermore, in the example, processing system 114 may determine the applicable fitting category based on the current point and locations in the vector space of centroids of clusters corresponding to the predefined fitting categories. For instance, processing system 114 may determine a Euclidean distance between the current point and each of the centroids. Processing system 114 may then determine that the applicable fitting category is the fitting category corresponding to the closest centroid to the current point.

Processing system 114 may train ML model 246. In some examples, processing system 114 may train ML model 246 based on training data from a plurality of users. In some examples, processing system 114 may obtain user-specific training data that is specific to user 104 of hearing instrument 102A. In such examples, processing system 114 may use the user-specific training data to train ML model 246 to determine the applicable fitting category. The user-specific training data may include training data pairs that include sets of input values and target output values. The sets of input values may be generated by sensors 118 when user 104 wears hearing instrument 102A. The target output values may indicate actual fitting categories corresponding to the sets of input values. The target output values may be determined by user 104 or another person, such as a hearing professional.

Furthermore, with continued reference to FIG. 4, processing system 114 may generate an indication based on the applicable fitting category of hearing instrument 102A (406). In some examples, as part of generating the indication based on the applicable fitting category, processing system 114 may cause one or more of hearing instruments 102 to generate an audible or tactile stimulus to indicate the applicable fitting category. For instance, as an example of an audible stimulus, processing system 114 may cause one or more of speakers 108 to output a sound (e.g., a tone pattern corresponding to the applicable fitting category, a beeping pattern corresponding to the fitting category, a voice message corresponding to the fitting category, or another type of sound corresponding to the fitting category). As an example of a tactile stimulus, processing system 114 may cause one or more vibration units of one or more hearing instruments 102 to generate a vibration pattern corresponding to the fitting category.

In some examples, processing system 114 may cause one or more devices other than hearing instrument 102A (or hearing instrument 102B) to generate the indication based on the applicable fitting category. For example, processing system 114 may cause an output device, such as a mobile device (e.g., mobile phone, tablet computer, laptop computer), personal computer, extended reality (e.g., augment reality, mixed reality, or virtual reality) headset, smart speaker device, video telephony device, video gaming console, or other type device to generate the indication based on the applicable fitting category.

In some examples where the plurality of predefined fitting categories includes two or more fitting categories corresponding to different ways of incorrect ways of wearing hearing instrument 102A, processing system 114 may select, based on which one of the two or more incorrect ways of wearing hearing instrument 102A the applicable fitting category is, category-specific instructions that indicate how to reposition hearing instrument 102A from the applicable (incorrect) fitting category to the correct way of wearing hearing instrument 102A. Processing system 114 may cause an output device (e.g., one or more of hearing instruments 102, a mobile device, personal computer, XR headset, smart speaker device, video telephony device, etc.) to output the category-specific instructions.

For example, the category-specific instructions may include a category-specific video showing how to reposition hearing instrument 102A from the applicable (incorrect) fitting category to the correct way of wearing hearing instrument 102A. For instance, the video may include an animation showing hand motions that may be used to reposition hearing instrument 102A from the applicable fitting category to the correct way of wearing hearing instrument 102A. The animation may include a video of an actor performing the hand motions, a cartoon animation showing the hand motions, or other type of animated visual media showing the hand motions. Storage devices (e.g., storage devices 316 (FIG. 3)) may store videos for different types of fitting categories. Thus, processing system 114 may select a video corresponding to the applicable fitting category from among the stored videos.

Figure 10:
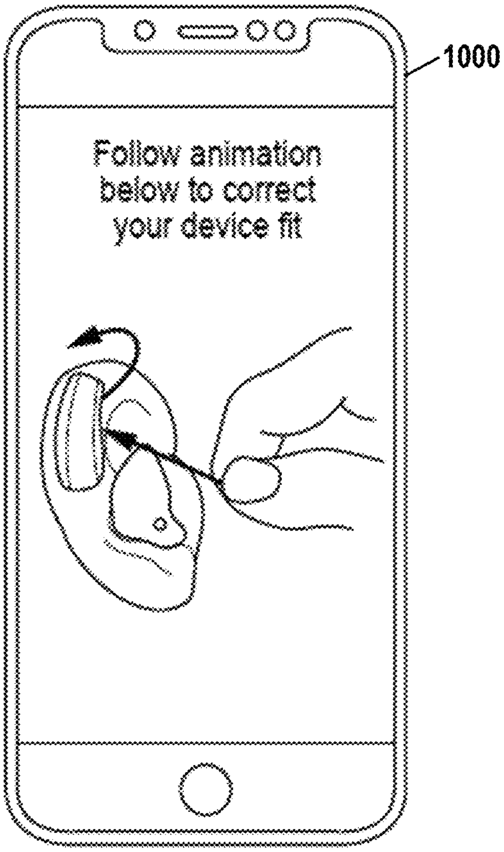
FIG. 10 is a conceptual diagram illustrating an example animation that guides a user to a correct fit, in accordance with one or more aspects of this disclosure.

FIG. 10 is a conceptual diagram illustrating an example animation that guides user 104 to a correct fit, in accordance with one or more aspects of this disclosure. In the example of FIG. 10, a mobile device 1000 displays an animation that guides user 104 to a correct fit. For instance, mobile device 1000 may display a category-specific animation that indicates how to reposition hearing instrument 102A from the applicable (incorrect) fitting category to the correct way of wearing hearing instrument 102A. For instance, in the example of FIG. 10, the animation may show how to change from the dangling fitting category to a fitting category corresponding to a correct way of wearing hearing instrument 102A.

In some examples, the category-specific instructions may include audio that verbally instructs user 104 how to reposition hearing instrument 102A from the applicable (incorrect) fitting category to the correct way of wearing hearing instrument 102A. In another example, the category-specific instructions may include text that instructs user 104 how to reposition hearing instrument 102A from the applicable (incorrect) fitting category to the correct way of wearing hearing instrument 102A. Storage devices (e.g., storage devices 316 (FIG. 3)) may store audio or text for different types of fitting categories. Thus, processing system 114 may select audio or text corresponding to the applicable fitting category from among the stored audio or text.

Figure 11:
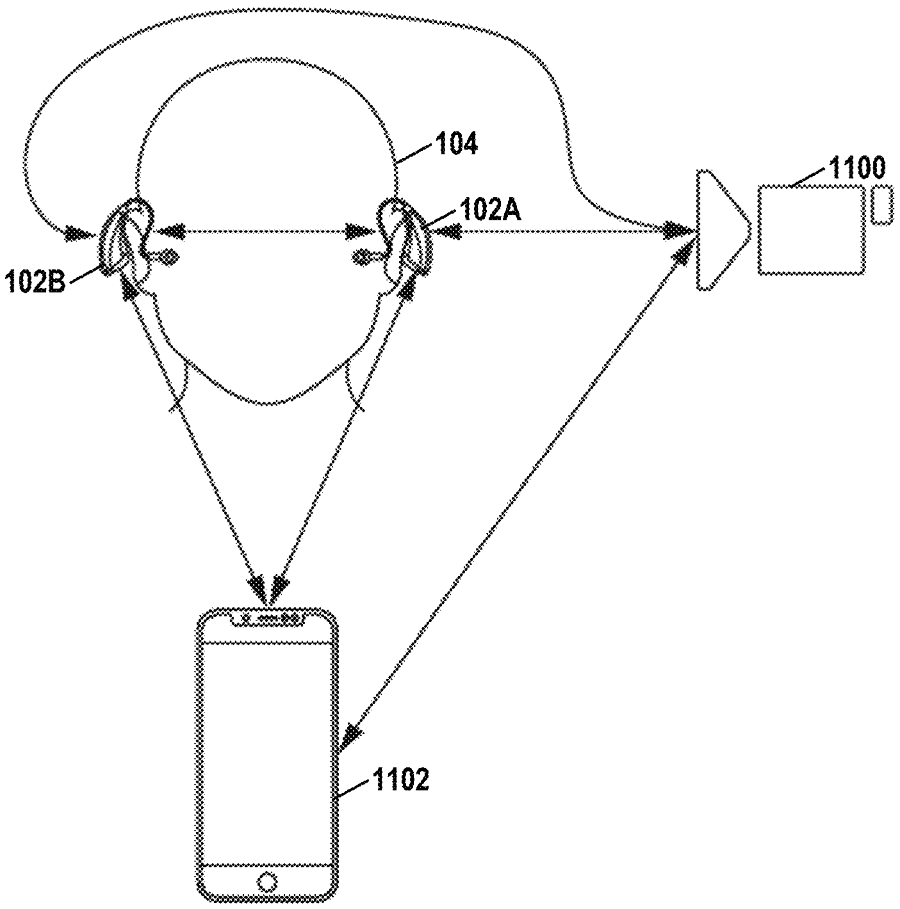
FIG. 11 is a conceptual diagram illustrating a system for detecting and guiding an ear-worn device fitting, in accordance with one or more aspects of this disclosure.

FIG. 11 is a conceptual diagram illustrating a system for helping user 10 fitting of hearing instruments 102, in accordance with one or more aspects of this disclosure. In some examples, such as the example of FIG. 11, system 100 (FIG. 1) may include a camera 1100. Camera 1100 may be integrated into a device, such as a mobile phone, tablet computer, laptop computer, webcam, or other type of device. Processing system 114 may obtain video from camera 1100 showing an ear of user 104. Based on the applicable fitting category being among the two or more incorrect ways of wearing hearing instrument 102A, processing system 114 may generate, based on the video and based on which one of the two or more incorrect ways of wearing hearing instrument 102A the applicable fitting category is, an augmented reality (AR) visualization showing how to reposition hearing instrument 102A from the applicable fitting category to the correct way of wearing hearing instrument 102A. For example, processing system 114 may perform a registration process that registers locations in the video with a virtual coordinate system. Processing system 114 may use one or more of various registration processes to perform the registration process, such as an iterative closest point algorithm. A virtual model of hearing instrument 102A may be associated with a location in the virtual coordinate system. Processing system 114 may use transform data generated by the registration process to convert the location of the virtual model of hearing instrument 102A from the virtual coordinate system to a location in the video. Processing system 114 may then modify the video to show the virtual model of hearing instrument 102A in the video, thereby generating the AR visualization. Processing system 114 may cause an output device 1102 to present the AR visualization. In the example of FIG. 11, output device 1102 is shown as a mobile phone, but in other examples, output device 1102 may be other types of devices.

Figure 12:
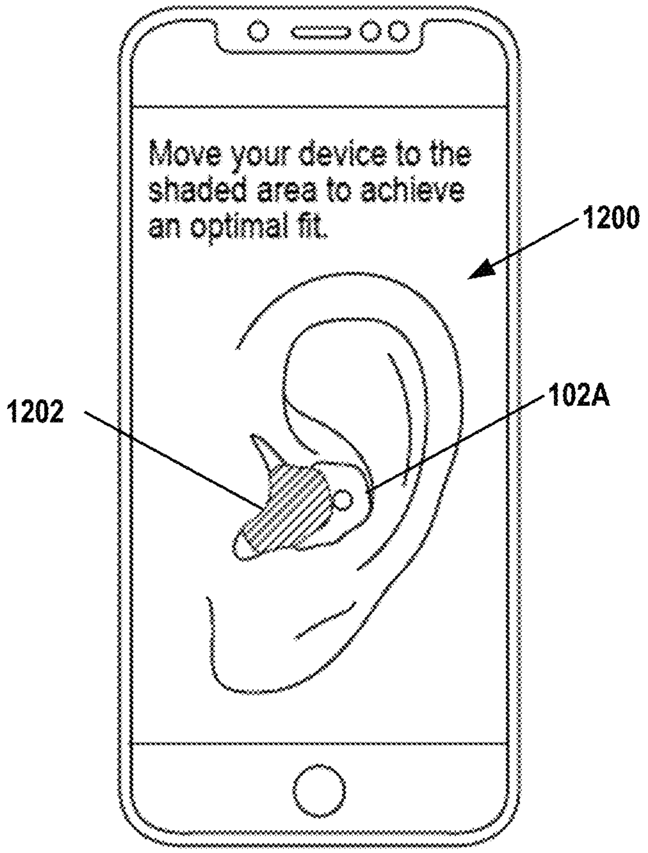
FIG. 12 is a conceptual diagram illustrating an example augmented reality (AR) visualization for guiding a user to a correct device fitting, in accordance with one or more aspects of this disclosure.

FIG. 12 is a conceptual diagram illustrating an example augmented reality visualization 1200 for guiding user 104 to a correct device fitting, in accordance with one or more aspects of this disclosure. In the example of FIG. 12, augmented reality visualization 1200 may include live video of an ear of user 104. The live video may be generated by a camera, such as camera 1100 (FIG. 11). The live video may also show a current position of hearing instrument 102A.

Additionally, augmented reality visualization 1200 may show a virtual hearing instrument 1202. Virtual hearing instrument 1202 may be a mesh or 3-dimensional mask. Virtual hearing instrument 1202 is positioned in AR visualization 1200 at a location relative to the ear of user 104 corresponding to a correct way of wearing hearing instrument 102A. For instance, in the example of FIG. 12, virtual hearing instrument 1202 is positioned further in an anterior direction than hearing instrument 102A is currently. This indicates to user 104 that user 104 should move hearing instrument 102A anteriorly. Because augmented reality visualization 1200 shows live video, the position of hearing instrument 102A changes in augmented reality visualization 1200 as user 104 changes the position of hearing instrument 102A. In some examples, processing system 114 may cause AR visualization 1200 to display a category-specific animation showing the virtual model of changing from the applicable fitting category to the correct way of wearing hearing instrument 102A.

Processing system 114 may determine the location of virtual hearing instrument 1202 within augmented reality visualization 1200. To determine the location of virtual hearing instrument 1202 within augmented reality visualization 1200, processing system 114 may apply a facial feature recognition system configured to recognize features of faces, such as the locations of ears or parts of ears (e.g., tragus, antitragus, concha, etc.). The facial feature recognition system may be implemented as a ML image recognition model trained to recognize the features of faces. With each of these augmented reality fittings, the facial feature recognition system can be trained and improved for a given individual.

In this way, processing system 114 may obtain, from a camera (e.g., camera 1100), video showing an ear of user 104. Based on the applicable fitting category being among the two or more fitting categories corresponding to ways of incorrectly wearing hearing instrument 102A, processing system 114 may generate, based on the video and based on which one of the two or more fitting categories corresponding to ways of incorrectly wearing hearing instrument 102A the applicable fitting category is, an augmented reality visualization showing how to reposition hearing instrument 102A from the applicable fitting category to the correct way of wearing hearing instrument 102A. Processing system 114 may then cause an output device (e.g., output device 1102) to present the augmented reality visualization.

Figure 13:
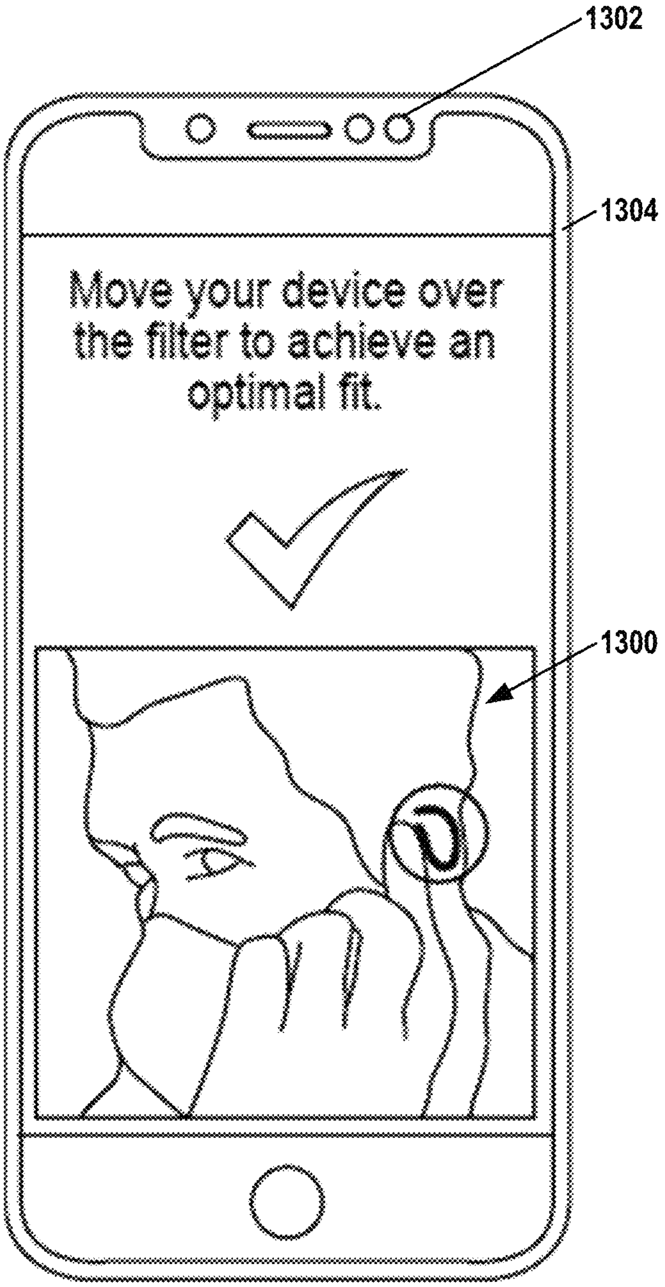
FIG. 13 is a conceptual diagram illustrating an example augmented reality (AR) visualization for guiding a user to a correct device fitting, in accordance with one or more aspects of this disclosure.

FIG. 13 is a conceptual diagram illustrating an example AR visualization 1300 for guiding user 104 to a correct device fitting, in accordance with one or more aspects of this disclosure. In the example of FIG. 13, processing system 114 may generate AR visualization 1300 based on video from a forward-facing camera 1302 of a device 1304 instead of a separate camera device. Device 1304 may be a mobile phone, tablet computer, personal computer, or other type of device. Processing system 114 may otherwise generate AR visualization 1300 in a similar manner as AR visualization 1200. Furthermore, in the example of FIG. 13, device 1300 may output an indication for display indicating whether user 104 is correctly wearing hearing instrument 102A.

In some examples, processing system 114 may gradually change the indication based on the applicable fitting category as hearing instrument 102A is moved closer or further from the correct way of wearing hearing instrument 102A. For example, processing system 114 may cause an output device to gradually increase or decrease haptic feedback (e.g., a vibration intensity, rate of haptic pulses, vibration frequency, etc.) as hearing instrument 102A gets closer or further from a fitting category, such as a fitting category corresponding to the correct way of wearing hearing instrument 102A. In some examples, processing system 114 may cause an output device to gradually increase or decrease audible feedback (e.g., a pitch of a tone, rate of beeping sounds, etc.) as hearing instrument 102A gets closer or further from the correct way of wearing hearing instrument 102A.

Processing system 114 may determine how to gradually change the indication based on the applicable fitting category in one or more ways. For example, ML model 246 may generate confidence values for two or more of the fitting categories. For instance, in an example where ML model 246 comprises a neural network, the values generated by output neurons of the neural network are confidence values. The confidence value for a fitting category may correspond to a level of confidence that the fitting category is the applicable fitting category. In general, processing system 114 may determine that the applicable fitting category is the fitting category having the greatest confidence value. In accordance with a technique of this disclosure, processing system 114 may gradually change the indication based on the confidence value for the fitting category corresponding to the correct way of wearing hearing instrument 102A. For instance, processing system 114 may cause an output device to generate more rapid beeps as the confidence value for the fitting category corresponding to the correct way of wearing hearing instrument 102A increases, thereby indicating to user 104 that hearing instrument 102A is getting closer to the correct way of wearing hearing instrument 102A (and farther from an incorrect way of wearing hearing instrument 102A).

In some examples, ML model 246 may include a k-means clustering model. As described elsewhere in this disclosure, in examples where ML model 246 includes a k-means clustering model, application of ML model 246 to determine the applicable fitting category may include determining, based on the sensor data, a current point in a vector space. Processing system 114 may determine the applicable fitting category based on the current point and locations in the vector space of centroids of clusters corresponding to the predefined fitting categories. In accordance with a technique of this disclosure, processing system 114 may determine a distance of the current point in the vector space to a centroid in the vector space of a cluster corresponding to the fitting category corresponding to the correct way of wearing hearing instrument 102A. In this example, processing system 114 may gradually change the indication based on the applicable fitting category based on the determined distance. Thus, in some examples, processing system 114 may cause an output device to generate more rapid beeps as the distance between the current point and the centroid decreases, thereby indicating to user 104 that hearing instrument 102A is getting closer to the correct way of wearing hearing instrument 102A.

In some examples, gamification techniques may be utilized to encourage user 104 to wear hearing instruments 102 correctly. Gamification may refer to applying game-like strategies and elements in non-game context to encourage engagement with a product. Gamification has become prevalent among health and wellness products (e.g., rewarding individuals for consistent product use, such as with virtual points or trophies).

In some examples, wearing hearing instrument 102A correctly may reward user 104 with in-app currency (e.g., points) that may unlock achievements and/or be used for in-app purchases (e.g., access to premium signal processing or personal assistant features) encouraging user 104 to continue engaging with the system. These positive reinforcements may increase satisfaction with hearing instruments 102. Examples of positive reinforcement may include receiving in-application currency, achievements, badges, or other virtual or real rewards.

Figure 14:
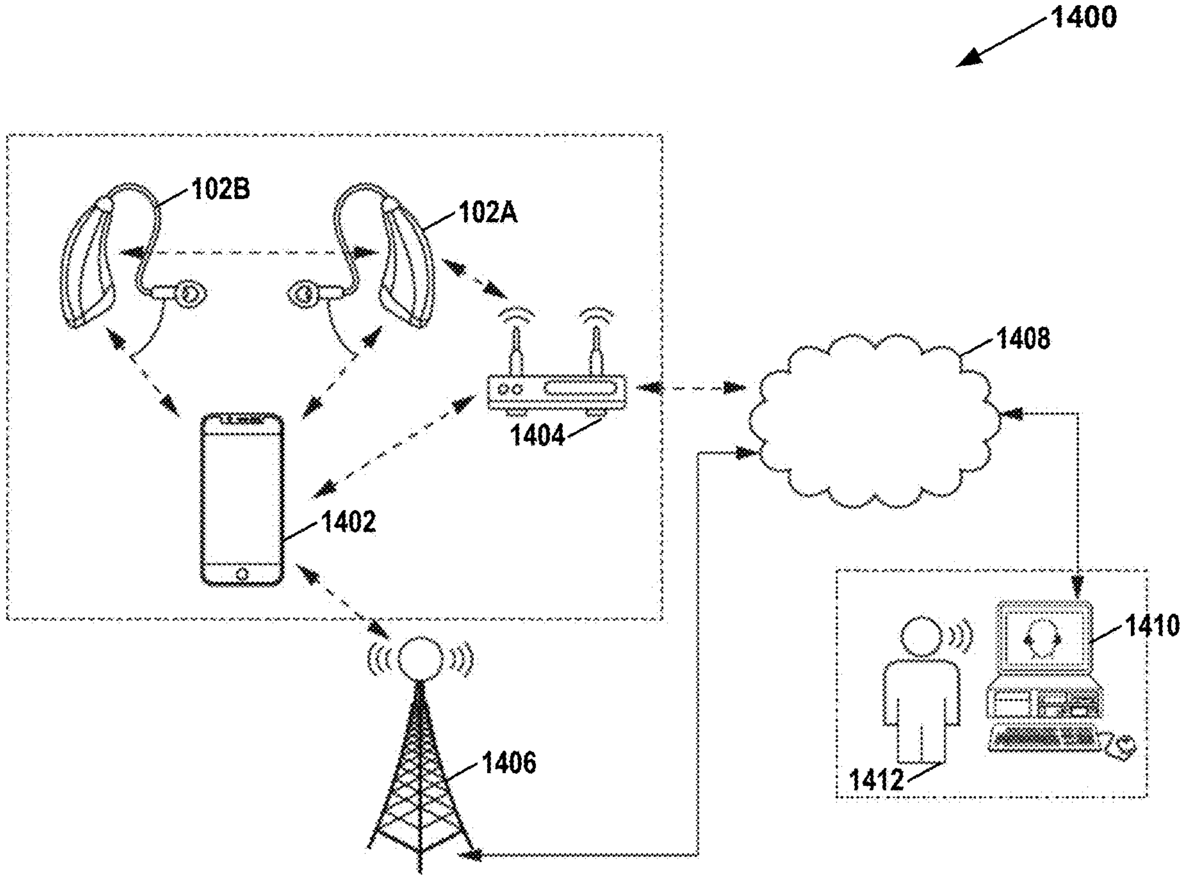
FIG. 14 is a conceptual diagram illustrating an example system in accordance with one or more aspects of this disclosure.

FIG. 14 is a conceptual diagram illustrating an example system 1400 in accordance with one or more aspects of this disclosure. System 1400 includes hearing instruments 102, a mobile device 1402, a wireless router 1404, a wireless base station 1406, a communication network 1408, and a provider computing system 1410. In the example of FIG. 14, hearing instruments 102 may send data to and receive data from provider computing system 1410 via mobile device 1402, wireless router 1404, wireless base station 1406, and communication network 1408. For instance, hearing instruments 102 may provide data about user activity (e.g., proportion of achieving correct fit, types of incorrect fit, time to achieve correct fit, etc.) to provider computing system 1410 for storage. A hearing professional 1412 (e.g., audiologist, technician, nurse, doctor, etc.), using provider computing system 1410 may review information based on the data provided by hearing instruments 102. For instance, hearing professional 1412 may review information indicating that user 104 consistently tries to wear hearing instruments 102 in a fitting category corresponding to a specific incorrect way of wearing hearing instruments 102.

In some examples, hearing professional 1412 may review the information during an online session with user 104. During such an online session, hearing professional 1412 may communicate with user 104 to help user 104 achieve a correct fitting of hearing instruments 102. For instance, hearing professional 1412 may communicate with user 104 via one or more of hearing instruments 102, mobile device 1402, or another communication device. In some examples, hearing professional 1412 may review the information outside the context of an online session with user 104.

In some examples, processing system 114 may determine, based on the applicable fitting category, whether to initiate an interactive communication session with hearing professional 1412. For example, processing system 114 may determine, by the processing system, based on a number of times that the applicable fitting category has been determined to be the fitting category corresponding to the incorrect way of wearing the hearing instrument, whether to initiate the interactive communication session with the hearing professional. Thus, if user 104 routinely tries to wear hearing instrument 102A in the same incorrect way, processing system 114 may (e.g., with permission of user 104) initiate an interactive communication session with hearing professional 1412 to enable hearing professional 1412 to coach user 104 on how to wear hearing instrument 102A correctly. The interactive communication session may be in the form of a live voice communication session conducted using microphones and speakers in one or more of hearing instruments 102, in the form of a live voice communication session via a smartphone or other computing device, in the form of a text message conversation conducted via a smartphone or other computing device, in the form of a video call via a smartphone or other computing device, or in another form.

Moreover, processing system 114 may determine whether to initiate the interactive communication session with hearing professional 1412 depending on which one of the fitting categories corresponding to ways of incorrectly wearing hearing instrument 102A the applicable fitting category is. For instance, it may be unnecessary to initiate an interactive communication session with hearing professional 1412 if the applicable fitting category corresponds to the "dangling" fitting category because it may be relatively easy to use written instructions or animations to show user 104 how to move hearing instrument 102A from the "dangling" fitting category to the fitting category corresponding to wearing hearing instrument 102A correctly. However, if the applicable fitting category corresponds to under-insertion of in-ear assembly 116A of hearing instrument 102A into an ear canal of user 104, interactive coaching with hearing professional 1412 may be more helpful. Thus, automatically initiating an interactive communication session with hearing professional 1412 based on the applicable fitting category may improve the performance of hearing instrument 102A from the perspective of user 104 because this may enable user 104 to learn how to wear hearing instrument 102A more quickly.

In some examples, provider computing system 1410 may aggregate data provided by multiple sets of hearing instruments to generate statistical data regarding fitting categories. Such statistical data may help hearing professionals and/or designers of hearing instruments to improve hearing instruments and/or techniques for helping users achieve correct fittings of hearing instruments.

In some examples, the techniques of this disclosure may be used to monitor fitting categories of in-ear assemblies 116 of hearing instruments 102 over time, e.g., during daily wear or over the course of days, weeks, months, years, etc. That is, rather than only performing an operation to generate an indication of a fitting category when user 104 is first using hearing instruments 102, the operation may be performed for ongoing monitoring of the fitting categories of hearing instruments 102 (e.g., after user 104 has inserted in-ear assemblies 116 of hearing instruments 102 to a proper depth of insertion). Continued monitoring of the fitting categories of in-ear assemblies 116 of hearing instruments 102 may be useful for users for whom in-ear assemblies 116 of hearing instruments 102 tend to wiggle out. In such cases, processing system 114 may automatically initiate the operation to determine and indicate the fitting categories of hearing instruments 102 and, if an in-ear assembly of a hearing instrument is not worn correctly, processing system 114 may generate category-specific instructions indicating how to reposition the hearing instrument to the correct way of wearing the hearing instrument.

Furthermore, in some examples, processing system 114 may track the number of times and/or frequency with which a hearing instrument goes from a correct way of wearing the hearing instrument to an incorrect way of wearing the hearing instrument insertion during use. If this occurs a sufficient number of times and/or at a specific rate, processing system 114 may perform various actions. For example, processing system 114 may generate an indication to user 104 recommending user 104 perform an action, such as change a size of an earbud of the in-ear assembly or consult a hearing specialist or audiologist to determine if an alternative (e.g., custom, semi-custom, etc.) earmold may provide greater benefit to user 104. Thus, in some examples, processing system 114 may generate, based at least in part on the fitting category of in-ear assembly 116A of hearing instrument 102A, an indication that user 104 should change a size of an earbud of the in-ear assembly 116A of hearing instrument 102A. Furthermore, in some examples, if processing system 114 receives an indication that user 104 indicated (to the hearing instruments 102, via an application, or other device) that user 104 is interested in pursuing this option, processing system 114 may connect to the Internet/location services to find an appropriate healthcare provider in an area of user 104.

FIG. 15A, FIG. 15B, FIG. 15C, and FIG. 15D are conceptual diagrams illustrating example in-ear assemblies inserted into ear canals of users, in accordance with one or more aspects of this disclosure. In some examples, processing system 114 may determine that a depth of insertion of in-ear assembly 116A of hearing instrument 102A into the ear canal is the first class or the second class depending on whether the distance metric is associated with a distance within a specified range. Processing system 114 may provide the depth and/or class as input to ML model 246 to the purpose of determining a fitting category of hearing instrument 102A. The specified range may be defined by (1) an upper end of the range of ear canal lengths for the user minus a length of all or part of in-ear assembly 116A of hearing instrument 102A and (2) a lower end of the range of ear canal lengths of the user minus the length of all or part of in-ear assembly 116A of hearing instrument 102A. Thus, the specified range may take into account the size of in-ear assembly 116A, which may contain speaker 108A, microphone 110A, and earbud 1500. For instance, the length of all or part of in-ear assembly 116A may be limited to earbud 1500; a portion of in-ear assembly 116A that contains speaker 108A, microphone 110A, and earbud 1500; or all of in-ear assembly 116A.

Figure 15A:
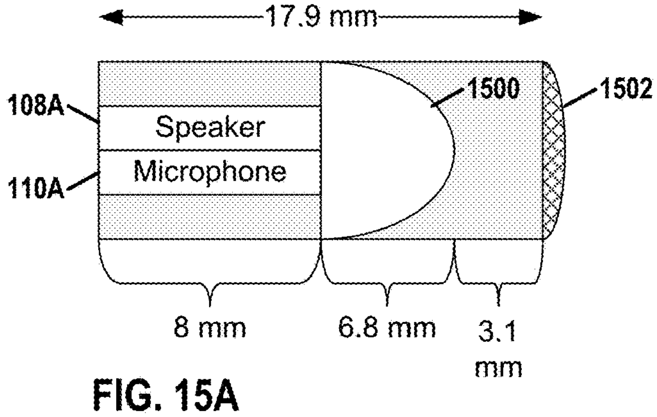
FIG. 15A, FIG. 15B, FIG. 15C, and FIG. 15D are conceptual diagrams illustrating example in-ear assemblies inserted into ear canals of users, in accordance with one or more aspects of this disclosure.
Figure 15B:
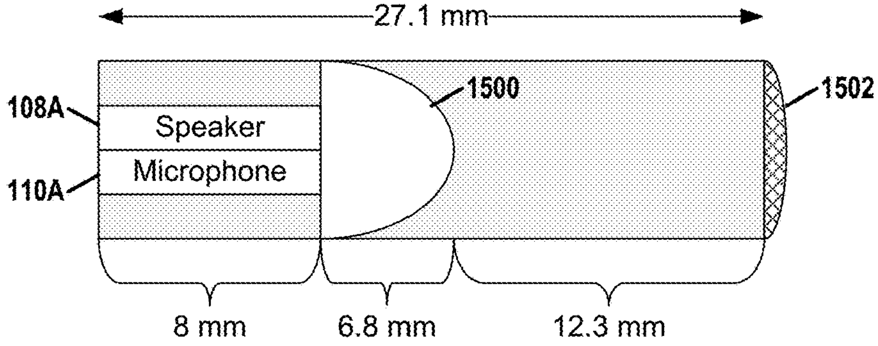

For example, if an average ear canal length for a female is 22.5 millimeters (mm), with a standard deviation (SD) of 2.3 mm, then most females have an ear canal length between 17.9-27.1 mm (mean±2 SD). Assuming that a correct fitting of a hearing instrument 102A involves in-ear assembly 116A being entirely in the ear canal of user 104, and that in-ear assembly 116A is 14.8 mm long, then the correct fitting occurs when in-ear assembly 116A is between 3.1 mm (17.9-14.8=3.1) and 12.3 mm (27.1-14.8=12.3) from the tympanic membrane 1502 of user 104 (FIG. 15A). In this example, the specified range is 3.1 mm to 12.3 mm. In the examples of FIGS. 15A-15D, in-ear assembly 116A includes speaker 108A, microphone 110A, and an earbud 1500. The shaded areas in FIGS. 15A-15D correspond to the user's ear canal. FIGS. 15A-15D also show a tympanic membrane 1502 of user 104. FIG. 15A shows correct insertion when the total length of the user's ear canal is at the short end of the range of typical ear canal lengths for females (i.e., 17.9 mm). FIG. 15B shows correct insertion when the total length of the user's ear canal is at the long end of the range of typical ear canal lengths for females (i.e., 27.1 mm).

FIGS. 15A-15D show tympanic membrane 1502 as an arc-shaped structure. In reality, tympanic membrane 1502 may be angled relative to the ear canal and may span a length of approximately 6 mm from the superior end of tympanic membrane 1502 to a vertex of tympanic membrane, which is more medial than the superior end of tympanic membrane 1502. The acoustically estimated distance metric from in-ear assembly 116A to tympanic membrane 1502 is typically considered to be (or otherwise associated with) a distance from in-ear assembly 116A to a location between a superior end of tympanic membrane 1502 and the umbo of tympanic membrane 1502, which is located in the center part of tympanic membrane 1502. In some instances, the location between the superior end of tympanic membrane 1502 and the umbo of tympanic membrane 1502 is closer to a superior end than the umbo of tympanic membrane 1502.

Figure 15C:
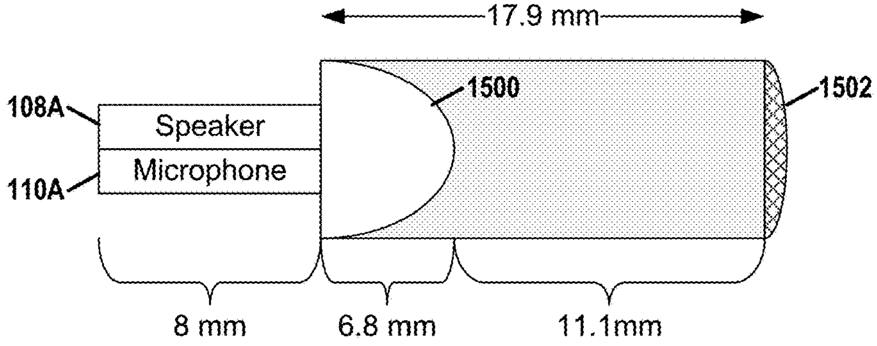
Figure 15D:
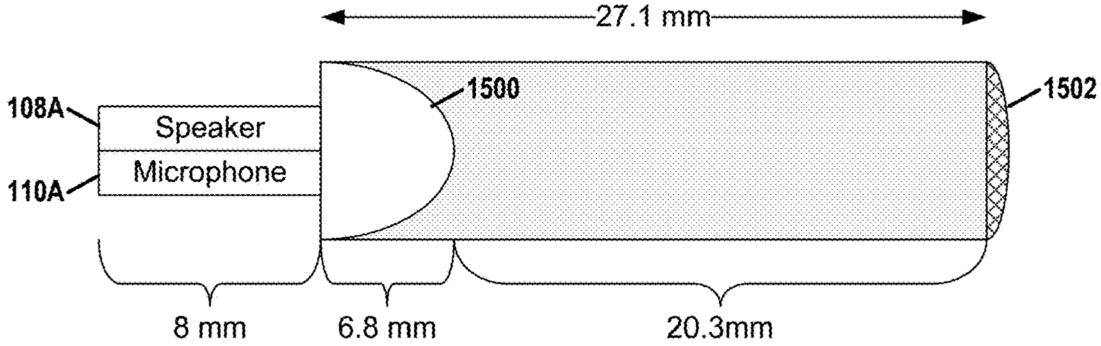

If it is assumed that hearing instrument 102A has a "poor" fitting when user 104 only inserts earbud 1500 into the user's ear canal and it is assumed that earbud 1500 is 6.8 mm long, then a poor fitting may mean that in-ear assembly 116A is between 11.1 and 20.3 mm from the user's eardrum 502 (17.9−6.8=11.1; and 27.1−6.8=20.3) (FIG. 15C and FIG. 15D). In this example, if the ¼ wavelength of the notch frequency implies that the distance from in-ear assembly 116A to tympanic membrane 1502 is less than 11 mm, processing system 114 may determine that in-ear assembly 116A is likely inserted correctly (e.g., as shown in FIG. 15A and FIG. 15B). However, if the ¼ wavelength of the notch frequency implies that the distance from in-ear assembly 116A to tympanic membrane 1502 is greater than 12.3 mm (e.g., as shown in FIG. 15D), processing system 114 may determine that in-ear assembly 116A is likely not inserted properly.

If the ¼ wavelength of the notch frequency implies that the distance from in-ear assembly 116A to tympanic membrane 1502 is between 11 mm and 12.3 mm, the reading may be ambiguous. That is, in-ear assembly 116A could be inserted properly for someone with a larger ear canal but not for someone with a smaller ear canal. In this case, processing system 114 may output an indication instructing user 104 to try inserting in-ear assembly 116A more deeply into the ear canal of user 104 and/or to try a differently sized earbud (e.g., because earbud 1500 may be too big and may be preventing user 104 from inserting in-ear assembly 116A deeply enough into the ear canal of user 104). Additionally, processing system 114 may output an indication instructing user 104 to perform a fitting operation again. If the distance from in-ear assembly 116A to tympanic membrane 1502 is now within the acceptable range, it is likely that in-ear assembly 116A was not inserted deeply enough. However, if the estimated distance from in-ear assembly 116A to tympanic membrane 1502 does not change, this may suggest that user 104 just has longer ear canals than average. The measurement of the distance from in-ear assembly 116A to tympanic membrane 1502 may be made multiple times over days, weeks, month, years, etc. and the results monitored over time to determine a range of normal placement for user 104.

Figure 16:
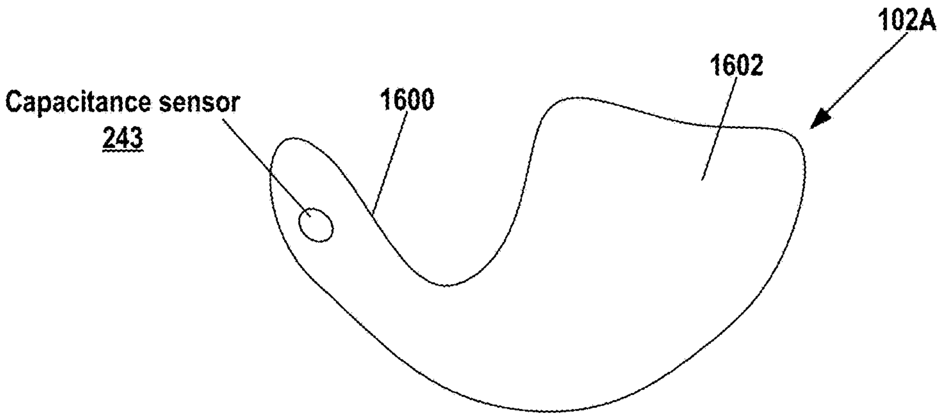
FIG. 16 is a conceptual diagram illustrating an example of placement of a capacitance sensor along a retention feature of a shell of a hearing instrument, in accordance with one or more aspects of this disclosure.

FIG. 16 is a conceptual diagram illustrating an example of placement of capacitance sensor 243 along a retention feature 1600 of a shell 1602 of hearing instrument 102A, in accordance with one or more aspects of this disclosure. Retention feature 1600 may be a canal lock or other feature of or connected to shell 1602 for retaining hearing instrument 102A at an appropriate location relative to an ear of user 104. Capacitance sensor 243 may include one or more electrodes that include one or more conductive materials, such as metallics and conductive plastics. Capacitance sensor 243 may be configured to detect the presence of other conductive materials, such as body tissue, within a sphere of influence of capacitance sensor 243. The electrodes of capacitance sensor 243 may be connected to a general-purpose input/output pin of a processing circuit, such as a dedicated microchip or other type of processing circuit (e.g., one or more of processors 112A), of hearing instrument 102. The processing circuit may use one or more existing algorithms to determine whether a conductive material is within the sphere of influence of capacitance sensor 243.

In the example of FIG. 16, capacitance sensor 243 is located on retention feature 1600. In other examples, capacitance sensor 243 may be located elsewhere on hearing instrument 102A. For example, capacitance sensor 243 may be located on a body of hearing instrument 102A, a RIC cable of hearing instrument 102A, a sport lock of hearing instrument 102A, or elsewhere.

Processing system 114 may use a signal generated by capacitance sensor 243 to detect the presence or proximity of tissue contact. For instance, processing system 114 may determine, based on the signal generated by capacitance sensor 243, whether capacitance sensor 243 is in contact with the skin of user 104. Processing system 243 may determine a fitting category of hearing instrument 102A based on whether capacitance sensor 243 is in contact with the skin of user 104. For instance, in some examples, processing system 243 may directly determine that user 104 is not wearing hearing instrument 102A properly if capacitance sensor 243 is not in contact with the skin of user 104 and may determine that user 104 is wearing hearing instrument 102A correctly if capacitance sensor 243 is in contact with the skin of user 104. In some examples, processing system 114 may provide, as input to an ML model (e.g., ML model 246) that determines the applicable category, data indicating whether capacitance sensor 243 is in contact with the skin of user 104.

Figure 17A:
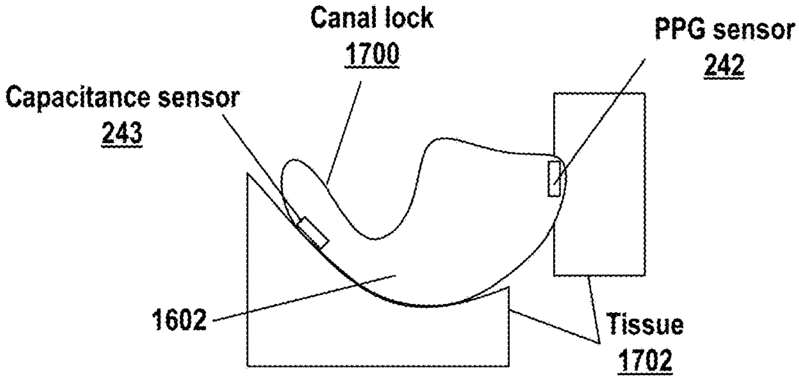
FIG. 17A is a conceptual diagram illustrating an example of placement of a capacitance sensor when the user is wearing a hearing instrument properly, in accordance with one or more aspects of this disclosure.
Figure 17B:
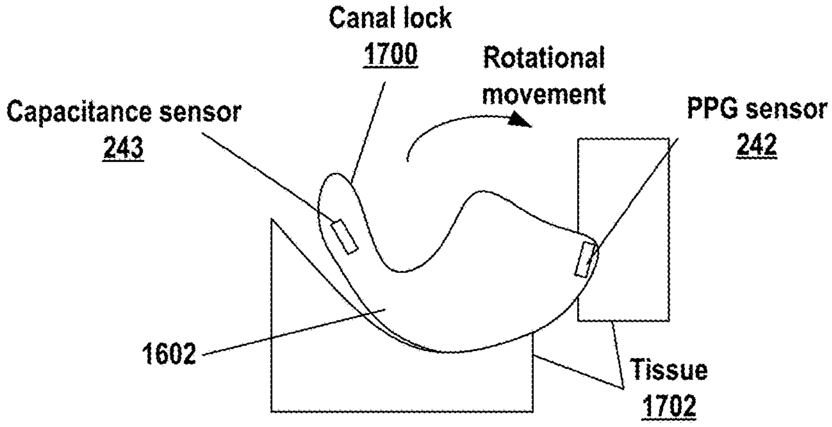
FIG. 17B is a conceptual diagram illustrating an example of placement of a capacitance sensor when the user is not wearing a hearing instrument properly, in accordance with one or more aspects of this disclosure.

FIG. 17A is a conceptual diagram illustrating an example of placement of capacitance sensor 243 when user 104 is wearing hearing instrument 102A properly, in accordance with one or more aspects of this disclosure. FIG. 17B is a conceptual diagram illustrating an example of placement of capacitance sensor 243 when user 104 is not wearing hearing instrument 102A properly, in accordance with one or more aspects of this disclosure. In the examples of FIG. 17A and FIG. 17B, capacitance sensor 243 is included in a canal lock 1700 of shell 1602 of hearing instrument 102A. Furthermore, in the examples of FIG. 17A and FIG. 17B, hearing instrument includes PPG sensor 242. As shown in FIG. 17A, capacitance sensor 243 is in contact with tissue 1702 of user 104 when user 104 is wearing hearing instrument 102A correctly. However, as shown in the example of FIG. 17B, capacitance sensor 243 is not in contact with tissue 1702 of user 104 because of a rotational movement of hearing instrument 102A. In either case, PPG sensor 242 may still be in contact with tissue 1702 and processing system 114 may be unable to distinguish between correct and incorrect wear of hearing instrument 102 based on the signal from PPG sensor 242.

The following is a non-limited list of examples in accordance with one or more techniques of this disclosure.

Example 1: A method for fitting a hearing instrument includes obtaining, by a processing system, sensor data from a plurality of sensors belonging to a plurality of sensor types; applying, by the processing system, a machine learned (ML) model to determine, based on the sensor data, an applicable fitting category of the hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generating, by the processing system, an indication based on the applicable fitting category of the hearing instrument.

Example 2: The method of example 1, wherein the plurality of predefined fitting categories includes two or more fitting categories corresponding to different ways of incorrectly wearing the hearing instrument.

Example 3: The method of example 2, further includes selecting, by the processing system, based on which one of the two or more fitting categories corresponding to ways of incorrectly wearing the hearing instrument the applicable fitting category is, category-specific instructions indicating how to reposition the hearing instrument from the applicable fitting category to the correct way of wearing the hearing instrument; and causing, by the processing system, an output device to output the category-specific instructions.

Example 4: The method of example 3, wherein the category-specific instructions include a category-specific video showing how to reposition the hearing instrument from the applicable fitting category to the correct way of wearing the hearing instrument.

Example 5: The method of example 2, further includes obtaining, by the processing system, from a camera, video showing an ear of a user; based on the applicable fitting category being among the two or more fitting categories corresponding to ways of incorrectly wearing the hearing instrument: generating, by the processing system, based on the video and based on which one of the two or more fitting categories corresponding to ways of incorrectly wearing the hearing instrument the applicable fitting category is, an augmented reality visualization showing how to reposition the hearing instrument from the applicable fitting category to the correct way of wearing the hearing instrument; and causing, by the processing system, an output device to present the augmented reality visualization.

Example 6: The method of example 2, wherein the two or more fitting categories corresponding to different ways of incorrectly wearing the hearing instrument include: wear of the hearing instrument in an incorrect ear of a user, wear of the hearing instrument in an incorrect orientation, wear of the hearing instrument in a way that an in-ear assembly of the hearing instrument is at a position that is too shallow in an ear canal of the user, or wear of the hearing instrument such that a cable connecting a behind-the-ear assembly of the hearing instrument and the in-ear assembly of the hearing instrument is not medial of a pinna of an ear of the user.

Example 7: The method of example 1, further includes obtaining, by the processing system, user-specific training data that is specific to a user of the hearing instrument; and using, by the processing system, the user-specific training data to train the ML model to determine the applicable fitting category.

Example 8: The method of example 1, wherein the sensors include one or more of an electrocardiogram sensor, an inertial measurement unit (IMU), an electrocardiogram sensor, a temperature sensor, a photoplethysmography (PPG) sensor, a microphone, a capacitance sensor, or one or more cameras.

Example 9: The method of example 1, wherein one or more of the sensors are included in the hearing instrument.

Example 10: The method of example 1, wherein: the hearing instrument includes an in-ear assembly and a behind-the-ear assembly, a cable connects the in-ear assembly and the behind-the-ear assembly, and the sensors include one or more sensors directly attached to the cable.

Example 11: The method of example 1, wherein generating the indication comprises causing, by the processing system, the hearing instrument to generate an audible or tactile stimulus to indicate the applicable fitting category.

Example 12: The method of example 1, wherein generating the indication comprises causing, by the processing system, a device other than the hearing instrument to generate the indication.

Example 13: The method of example 1, wherein generating the indication comprises gradually changing, by the processing system, the indication as the hearing instrument is moved closer or further from the correct way of wearing the hearing instrument.

Example 14: The method of example 13, wherein: applying the ML model comprises determining, by the processing system, a confidence value for the fitting category corresponding to the correct way of wearing the hearing instrument; and gradually changing, by the processing system, the indication comprises determining the indication based on the confidence value for the fitting category corresponding to the correct way of wearing the hearing instrument.

Example 15: The method of example 13, wherein: the ML model is a k-means clustering model, and applying the ML model comprises: determining, by the processing system, based on the sensor data, a current point in a vector space; and determining, by the processing system, the applicable fitting category based on the current point and locations in the vector space of centroids of clusters corresponding to the predefined fitting categories, and the method further comprises determining, by the processing system, a distance of the current point in the vector space to a centroid in the vector space of a cluster corresponding to the fitting category corresponding to the correct way of wearing the hearing instrument; and gradually changing the indication comprises determining, by the processing system, the indication based on the distance.

Example 16: The method of example 1, further includes determining, by the processing system, based on the applicable fitting category, whether to initiate an interactive communication session with a hearing professional; and based on a determination to initiate the interactive communication session with the hearing professional, initiating, by the processing system, the interactive communication session with the hearing professional.

Example 17: The method of example 16, wherein determining whether to initiate the interactive communication session with the hearing professional comprises determining, by the processing system, based on a number of times that the applicable fitting category has been determined to be the fitting category corresponding to the incorrect way of wearing the hearing instrument, whether to initiate the interactive communication session with the hearing professional.

Example 18: A system includes a plurality of sensors belonging to a plurality of sensor types; and a processing system includes obtain sensor data from the plurality of sensors; apply a machine learned (ML) model to determine, based on the sensor data, an applicable fitting category of a hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generate an indication based on the applicable fitting category of the hearing instrument.

Example 19: The system of example 18, wherein the plurality of predefined fitting categories includes two or more fitting categories corresponding to different ways of incorrectly wearing the hearing instrument.

Example 20: The system of example 19, wherein the processing system is further configured to, based on the applicable fitting category being among the two or more fitting categories corresponding to ways of incorrectly wearing the hearing instrument: select, based on which one of the two or more fitting categories corresponding to ways of incorrectly wearing the hearing instrument the applicable fitting category is, category-specific instructions indicating how to reposition the hearing instrument from the applicable fitting category to the correct way of wearing the hearing instrument; and cause an output device to output the category-specific instructions.

Example 21: The system of example 20, wherein the category-specific instructions include a category-specific video showing how to reposition the hearing instrument from the applicable fitting category to the correct way of wearing the hearing instrument.

Example 22: The system of example 19, wherein: the processing system is further configured to obtain, from a camera, video showing an ear of a user; based on the applicable fitting category being among the two or more fitting categories corresponding to ways of incorrectly wearing the hearing instrument: generate, based on the video and based on which one of the two or more fitting categories corresponding to ways of incorrectly wearing the hearing instrument the applicable fitting category is, an augmented reality visualization showing how to reposition the hearing instrument from the applicable fitting category to the correct way of wearing the hearing instrument; and cause an output device to present the augmented reality visualization.

Example 23: The system of example 19, wherein the two or more fitting categories corresponding to different ways of incorrectly wearing the hearing instrument include: wear of the hearing instrument in an incorrect ear of a user, wear of the hearing instrument in an incorrect orientation, wear of the hearing instrument in a way that an in-ear assembly of the hearing instrument is at a position that is too shallow in an ear canal of the user, or wear of the hearing instrument such that a cable connecting a behind-the-ear assembly of the hearing instrument and the in-ear assembly of the hearing instrument is not medial of a pinna of an ear of the user.

Example 24: The system of example 18, wherein the processing system is further configured to: obtain user-specific training data that is specific to a user of the hearing instrument; and use the user-specific training data to train the ML model to determine the applicable fitting category.

Example 25: The system of example 18, wherein the sensors include one or more of an electrocardiogram sensor, an inertial measurement unit (IMU), an electroencephalogram sensor, a temperature sensor, a photoplethysmography (PPG) sensor, a microphone, a capacitance sensors, or one or more cameras.

Example 26: The system of example 18, wherein the system includes the hearing instrument and the hearing instrument includes one or more of the sensors.

Example 27: The system of example 18, wherein: the system includes the hearing instrument, the hearing instrument includes an in-ear assembly and a behind-the-ear assembly, a cable connects the in-ear assembly and the behind-the-ear assembly, and the sensors include one or more sensors directly attached to the cable.

Example 28: The system of example 18, wherein the processing system is configured to, as part of generating the indication, cause the hearing instrument to generate an audible or tactile stimulus to indicate the applicable fitting category.

Example 29: The system of example 18, wherein the processing system is configured to, as part of generating the indication, cause a device other than the hearing instrument to generate the indication.

Example 30: The system of example 18, wherein the processing system is configured to, as part of generating the indication, gradually change the indication as the hearing instrument is moved closer or further from the correct way of wearing the hearing instrument.

Example 31: The system of example 30, wherein: the processing system is configured to, as part of applying the ML model, determine a confidence value for the fitting category corresponding to the correct way of wearing the hearing instrument; and the processing system is configured to, as part of gradually changing the indication, determine the indication based on the confidence value for the category corresponding to the correct way of wearing the hearing instrument.

Example 32: The system of example 30, wherein: the ML model is a k-means clustering model, the processing system is configured to, as part of applying the ML model: determine, based on the sensor data, a current point in a vector space; and determine the applicable fitting category based on the current point and locations in the vector space of centroids of clusters corresponding to the predefined fitting categories, the processing system is further configured to determine a distance of the current point in the vector space to a centroid in the vector space of a cluster corresponding to the fitting category corresponding to the correct way of wearing the hearing instrument; and the processing system is configured to, as part of gradually changing the indication based on the applicable fitting category, determine the indication.

Example 33: The system of example 18, wherein the processing system is further configured to: determine, based on the applicable fitting category, whether to initiate an interactive communication session with a hearing professional; and based on a determination to initiate the interactive communication session with the hearing professional, initiate the interactive communication session with the hearing professional.

Example 34: The system of example 33, wherein the processing system is configured to, as part of determining whether to initiate the interactive communication session with the hearing professional, determine, based on a number of times that the applicable fitting category has been determined to be the fitting category corresponding to the incorrect way of wearing the hearing instrument, whether to initiate the interactive communication session with the hearing professional.

Example 35: A computer-readable medium having instructions stored thereon that, when executed, cause one or more processors to perform the methods of any of examples 1-17.

Example 36: A system comprising means for performing the methods of any of examples 1-17.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user. Furthermore, it is to be understood that discussion in this disclosure of hearing instrument 102A (including components thereof, such as in-ear assembly 116A, speaker 108A, microphone 110A, processors 112A, etc.) may apply with respect to hearing instrument 102B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for fitting a hearing instrument, the method comprising:

obtaining, by a processing system, sensor data from a plurality of sensors belonging to a plurality of sensor types;

applying, by the processing system, a machine learned (ML) model to determine, based on the sensor data, an applicable fitting category of the hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generating, by the processing system, an indication based on the applicable fitting category of the hearing instrument.

2. The method of claim 1, wherein the plurality of predefined fitting categories includes two or more fitting categories corresponding to different ways of incorrectly wearing the hearing instrument.

3. The method of claim 2, further comprising, based on the applicable fitting category being among the two or more fitting categories corresponding to ways of incorrectly wearing the hearing instrument:

selecting, by the processing system, based on which one of the two or more fitting categories corresponding to ways of incorrectly wearing the hearing instrument the applicable fitting category is, category-specific instructions indicating how to reposition the hearing instrument from the applicable fitting category to the correct way of wearing the hearing instrument; and causing, by the processing system, an output device to output the category-specific instructions.

4. The method of claim 3, wherein the category-specific instructions include a category-specific video showing how to reposition the hearing instrument from the applicable fitting category to the correct way of wearing the hearing instrument.

5. The method of claim 2, further comprising:

obtaining, by the processing system, from a camera, video showing an ear of a user;

based on the applicable fitting category being among the two or more fitting categories corresponding to ways of incorrectly wearing the hearing instrument:

generating, by the processing system, based on the video and based on which one of the two or more fitting categories corresponding to ways of incorrectly wearing the hearing instrument the applicable fitting category is, an augmented reality visualization showing how to reposition the hearing instrument from the applicable fitting category to the correct way of wearing the hearing instrument; and causing, by the processing system, an output device to present the augmented reality visualization.

6. The method of claim 2, wherein the two or more fitting categories corresponding to different ways of incorrectly wearing the hearing instrument include:

wear of the hearing instrument in an incorrect ear of a user, wear of the hearing instrument in an incorrect orientation, wear of the hearing instrument in a way that an in-ear assembly of the hearing instrument is at a position that is too shallow in an ear canal of the user, or wear of the hearing instrument such that a cable connecting a behind-the-ear assembly of the hearing instrument and the in-ear assembly of the hearing instrument is not medial of a pinna of an ear of the user.

7. The method of claim 1, further comprising:

obtaining, by the processing system, user-specific training data that is specific to a user of the hearing instrument; and using, by the processing system, the user-specific training data to train the ML model to determine the applicable fitting category.

8. The method of claim 1, wherein the sensors include one or more of an electrocardiogram sensor, an inertial measurement unit (IMU), an electroencephalogram sensor, a temperature sensor, a photoplethysmography (PPG) sensor, a microphone, a capacitance sensor, or one or more cameras.

9. The method of claim 1, wherein one or more of the sensors are included in the hearing instrument.

10. The method of claim 1, wherein generating the indication comprises causing, by the processing system, the hearing instrument to generate an audible or tactile stimulus to indicate the applicable fitting category.

11. The method of claim 1, wherein generating the indication comprises causing, by the processing system, a device other than the hearing instrument to generate the indication.

12. The method of claim 1, wherein generating the indication comprises gradually changing, by the processing system, the indication as the hearing instrument is moved closer or further from the correct way of wearing the hearing instrument.

13. The method of claim 12, wherein:

applying the ML model comprises determining, by the processing system, a confidence value for the fitting category corresponding to the correct way of wearing the hearing instrument; and gradually changing, by the processing system, the indication comprises determining the indication based on the confidence value for the fitting category corresponding to the correct way of wearing the hearing instrument.

14. The method of claim 13, wherein:

the ML model is a k-means clustering model, and applying the ML model comprises:

determining, by the processing system, based on the sensor data, a current point in a vector space; and determining, by the processing system, the applicable fitting category based on the current point and locations in the vector space of centroids of clusters corresponding to the predefined fitting categories, and the method further comprises determining, by the processing system, a distance of the current point in the vector space to a centroid in the vector space of a cluster corresponding to the fitting category corresponding to the correct way of wearing the hearing instrument; and gradually changing the indication comprises determining, by the processing system, the indication based on the distance.

15. The method of claim 13, further comprising:

determining, by the processing system, based on the applicable fitting category, whether to initiate an interactive communication session with a hearing professional; and based on a determination to initiate the interactive communication session with the hearing professional, initiating, by the processing system, the interactive communication session with the hearing professional.

16. The method of claim 15, wherein determining whether to initiate the interactive communication session with the hearing professional comprises determining, by the processing system, based on a number of times that the applicable fitting category has been determined to be the fitting category corresponding to the incorrect way of wearing the hearing instrument, whether to initiate the interactive communication session with the hearing professional.

17. A system comprising:

a plurality of sensors belonging to a plurality of sensor types; and a processing system comprising one or more processors implemented in circuitry, the processing system configured to:

obtain sensor data from the plurality of sensors;

apply a machine learned (ML) model to determine, based on the sensor data, an applicable fitting category of a hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generate an indication based on the applicable fitting category of the hearing instrument.

18. The system of claim 17, wherein the plurality of predefined fitting categories includes two or more fitting categories corresponding to different ways of incorrectly wearing the hearing instrument.

19. The system of claim 18, wherein the processing system is further configured to, based on the applicable fitting category being among the two or more fitting categories corresponding to ways of incorrectly wearing the hearing instrument:

select, based on which one of the two or more fitting categories corresponding to ways of incorrectly wearing the hearing instrument the applicable fitting category is, category-specific instructions indicating how to reposition the hearing instrument from the applicable fitting category to the correct way of wearing the hearing instrument; and cause an output device to output the category-specific instructions.

20. The system of claim 17, wherein the processing system is further configured to:

obtain user-specific training data that is specific to a user of the hearing instrument; and use the user-specific training data to train the ML model to determine the applicable fitting category.

21. The system of claim 17, wherein the system includes the hearing instrument and the hearing instrument includes one or more of the sensors.

22. The system of claim 17, wherein:

the system includes the hearing instrument, the hearing instrument includes an in-ear assembly and a behind-the-ear assembly, a cable connects the in-ear assembly and the behind-the-ear assembly, and the sensors include one or more sensors directly attached to the cable.

23. The system of claim 17, wherein the processing system is configured to, as part of generating the indication, cause a device other than the hearing instrument to generate the indication.

24. The system of claim 17, wherein the processing system is configured to, as part of generating the indication, gradually change the indication as the hearing instrument is moved closer or further from the correct way of wearing the hearing instrument.

25. A non-transitory computer-readable medium having instructions stored thereon that, when executed, cause one or more processors to:

obtain sensor data from a plurality of sensors belonging to a plurality of sensor types;

apply a machine learned (ML) model to determine, based on the sensor data, an applicable fitting category of a hearing instrument from among a plurality of predefined fitting categories, wherein the plurality of predefined fitting categories includes a fitting category corresponding to a correct way of wearing the hearing instrument and a fitting category corresponding to an incorrect way of wearing the hearing instrument; and generate an indication based on the applicable fitting category of the hearing instrument.

* * * * *